(12) United States Patent
Ohtani et al.

(10) Patent No.: US 6,212,545 B1
(45) Date of Patent: Apr. 3, 2001

(54) DISTRIBUTED SEARCHING SYSTEM AND SEARCHING APPARATUS FOR USE IN THE DISTRIBUTED SEARCHING SYSTEM

(75) Inventors: Takeshi Ohtani; Toshiro Minami, both of Fukuoka (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/179,873

(22) Filed: Oct. 28, 1998

(30) Foreign Application Priority Data

Oct. 31, 1997 (JP) .................................. 9-300188

(51) Int. Cl.[7] .................................. G06F 15/16
(52) U.S. Cl. .................................. 709/202; 709/201
(58) Field of Search .................................. 709/201, 202, 709/217, 218, 219; 707/1, 3, 10, 104

(56) References Cited

U.S. PATENT DOCUMENTS

| | | | |
|---|---|---|---|
| 5,696,965 | * 12/1997 | Dedrick | 709/201 |
| 5,706,516 | * 1/1998 | Chang et al. | 709/201 |
| 5,835,087 | * 11/1998 | Herz et al. | 345/327 |
| 5,877,759 | * 3/1999 | Bauer | 345/339 |
| 5,983,218 | * 9/1999 | Syeda-Mahmood | 707/3 |
| 6,021,443 | * 2/2000 | Bracho et al. | 709/241 |
| 6,055,573 | * 4/2000 | Gardenswartz et al. | 709/224 |
| 6,072,409 | * 6/2000 | Fushimi et al. | 340/988 |

OTHER PUBLICATIONS

Jonathan Bredin, "Market–Based Mobile–Agent Planning: A Thesis Proposal," http://www.cs.dartmouth.edu/~jjonathan/agents/proposal/index.html, Jun. 15, 1999.*

* cited by examiner

*Primary Examiner*—Mehmet B. Geckil
(74) *Attorney, Agent, or Firm*—Staas & Halsey LLP

(57) ABSTRACT

A distributed search system that includes a plurality of agents connected on a network that includes an information resource provider. The information resource provider registers information corresponding to information resources to his nearest agent. The agent stores that information in its storage device and transfers it to the neighboring agents as advertisement information. The transferred advertisement information includes cost information. The agents which receive the advertisement information store it in their storage devices and transfer the advertisement information to the neighboring agents repeatedly, in a range determined on the basis of the cost information. The cost information may be included in a search request of an information resource searcher making a search request to search the stored advertisement information. The information resource searcher sends the search request including the cost information to agents in a range of transmission corresponding to the cost information included in the search request.

24 Claims, 20 Drawing Sheets

⊕ AGENT HAVING THE INFORMATION RESOURCE FROM THE BEGINNING WITH THE ADVERTISEMENT BY INFORMATION PROVIDER.

⊘ AGENT HAVING OBTAINED THE RESOURCE INFORMATION WITH THE RESEARCH OF USER.

⊘ RESOURCE INFORMATION IS HELD CONTINUOUSLY EVEN AFTER A CERTAIN TIME HAS PASSED.

```
ID: P012345
From: foo@bar.some.where
Subject: Sales of vehicle
Keywords: vehicle, automobile, sales, purchasing
URL: http://hoge.hoge/goo.html
Maintainer: maintainer@some.domain
Cost: 30000
Date: 19970515121530
Path: A.B.C:D.E
```

```
┌─1, 3────────────────────────────┐
│ ID: 098765@A                    │
│ From: boo@dar.some.where        │
│ Subject:                        │
│ Keywords: vehicle, purchasing   │
│ URL:                            │
│ Maintainer:                     │
│ Date: 19970515121530            │
│ Cost: 30000                     │
│ Path: A.B.C:D.E                 │
└─────────────────────────────────┘
```
FIG. 8a

```
┌─2───────────────────────────────┐
│ ID: 098765@A                    │
│ From: boo@dar.some.where        │
│ Subject:                        │
│ Keywords:                       │
│ URL: http://hoge.hoge/goo.html  │
│ Maintainer:                     │
│ Date: 19970515121530            │
│ Cost: 30000                     │
│ Path: A.B.C:D.E                 │
└─────────────────────────────────┘
```
FIG. 8b

```
┌─3─────────────────────────────────────┐
│ ID: 098765@A                          │
│ From: boo@dar.some.where              │
│ Subject:                              │
│ Keywords:                             │
│ URL:                                  │
│ Maintainer: maintainer@some.domain    │
│ Date: 19970515121530                  │
│ Cost: 30000                           │
│ Path: A.B.C:D.E                       │
└───────────────────────────────────────┘
```
FIG. 8c

―― RETURNING FORMAT OF SEARCH RESULT ――

ID: R98.765@A
Path: A:B:C
Date: 19980515121530
Result:

URL: http://hoge.oge/goo.html
    Subject: Sales of imported vehicles
    Keywords: Sales, Automobile, Imported vehicle
    Mail: foo@afo.bfo.co.jp
    Sender: foo@afo. bfo.co.jp
    Date: 19980315210304
    Expire: 19990315210304

---

URL: http://www.xxx.co.jp/zoo.html
    Subject: Home page of xx used car center
    Keywords: Used car, Purchasing, Sales
    Mail: goo@xxx.co.jp
    Sender: goo@xxx.co.jp
    Date: 19980416081223
    Expire: 19990416081223

---

URL: http://burimo.ponda.co.jp/welcome.html
    Subject: Welcome to Honda Primo Shop
    Keywords: Automobiles, Sales
    Mail: hoo@burimo.ponda.co.jp
    Sender: hoo@burimo.ponda.co.jp
    Date: 19980115114334
    Expire: 19990115114334

FIG. 10

DISTRIBUTED SEARCHING SYSTEM AND SEARCHING APPARATUS FOR USE IN THE DISTRIBUTED SEARCHING SYSTEM

CROSS-REFERENCE TO RELATED APPLICATIONS

This application is based upon and claims priority of Japanese Patent Application No. 9-300188, filed Oct. 31, 1997, the contents being incorporated herein by reference.

BACKGROUND OF THE INVENTION

1. Field of the Invention

The present invention relates to a distributed searching system in general, and, more particularly, the present invention relates to a distributing searching system for locating information resources in a large scale network of connected computers having respective available information resources.

2. Description of Related Art

Within the basic intangible resources of the information industry, information and service provided by computers is generally referred to as "information resources".

As a result of recent progress that has been made in network services, including the ability to connect an enormous number of computers and offering a variety of services, it has become difficult to ascertain the type of information resources possessed by each of the respective computers in a network.

Moreover, even if such information can be ascertained, since the network environment periodically changes due to maintenance and defects in the computers or the networks, information resources which have been previously used may not always be available. Therefore, it is necessary for users to ascertain which computers provide desired information resources using the most recent information available at the time the user actually uses the information resources.

In addition, many computers generally have the same information resources, and therefore it is natural that information resource quality, such as freshness, accuracy and degree of abstraction, etc. are different in each computer, depending on management policies of a computer manager. Therefore, it is preferable that users be able to determine which of the many computers have the best information resources.

However, information resources qualities cannot be identified until the information resources are actually used and compared with other information resources. To do so, however, requires a large amount of both time and labor, and is especially difficult for beginners who have poor knowledge of information resources. Therefore, the most effective method for identifying the best information resources assumes that those information resources which are recognized by many users as being reliable information resources the most effective.

In recent years, many network information resources can be accessed by the World Wide Web ("WWW"). Positional information of information resources can be expressed in the WWW by a Uniform Resource Locator ("URL"). When a user wants to utilize an information resource, the user must know the URL corresponding to the information resource. However, only a small number of URLs from among all information resources on the network are known by any single user. Therefore, as a method of searching for a URL corresponding to an information resource, a searching service, commonly referred to as a "search engine", is provided on the WWW.

The method executed in the searching service can basically be divided into two steps. The first step involves collecting information regarding information resources which are available through the network, and the second step involves administrating and providing the collected information for users. The information collection method is roughly classified into two kinds of systems, namely a directory service system and a robot system.

In a directory service system, an information resource providing side requests registration to a directory from a manager, or provider of an information resource that offers the search engine service, or directory service. Many search engines, such as Yahoo (http://www.yahoo.com/) and AltaVista (http://altavista.digital.com/), are examples of the directory service system. Since the information resource provider can reliably issue the registration request, information quality tends to be high. Nevertheless, a disadvantage of the directory service system is that the registration requests are often executed by a manager using a manual process, which results in overburdening the process load shared by the manager. Moreover, as a result of the substantial load, information cannot be updated quickly and accurately.

In the robot system, in order to automatically search existing URLs to establish the database of a URL, a trace is sequentially made for a link, or anchor in the Hyper-Text Mark-up Language ("HTML") documents using a program called a robot. HTML is a standard language that describes the information provided by the WWW. Examples of a robot system include WWW Worm (Colorado Univ., O. A. McBryan) and RBSE Spider (Houston Univ. D. Eichmann). However, only when a information resource provider informs someone of service of the information resource and the link to it has been extended by him, the information is registered to the database of information resources update of information resource and service must be made, reference is made to the information resource while the information resource provider is unaware of the update. Moreover, since information resources are searched mechanically, non-useful information resources may easily be picked up, generating a useless load on the network and computers.

Next, a method of administrating positional information of the collected information resources and providing such information resources to users is described as follows.

In a centralized management system, all data is served with a single server. The centralized management system is used in many search engines, including Yahoo and AltaVista. An advantage of the centralized management system is that maintenance is easily performed because there is only one administration. On the other hand, server load quickly becomes very large since access by users is concentrated to a single server. Moreover, the r centralized management system also has the disadvantage of high communication costs, which result for some users, making the service burdensome. Furthermore, if the server fails, the centralized management system can no longer offer the service.

In a distributed management system, data is administrated and served in common with other servers. This system can be classified as follows, depending on the procedure for sharing.

Each user in a distributed management system uses a server by selecting a most accessible server to distribute the load. Mirroring is an example of this system. An advantage of the distributed management system is that since many of the servers have the same functions, service can be continued even if a particular server fails. However, a user cannot benefit from this advantage if he cannot detect positional information of the alternative server to continue the same service. In addition, in the distributed management system, data management costs are high since all servers must hold the same data.

In a distribution of service system, service is classified into several categories, with each category being covered by respective servers. Domain Name Service ("DNS"), which makes reference to an IP 12 "Internet Protocol" IP address from the name of the computer, is an example of the distribution of service system. Wide Area Information Service ("WAIS") Pre is a large scale distributed database that can also be placed into this category. Moreover, the % distribution of service system is compatible with the distribution of access. In this system, since the server to be administrated is different depending on the kind of service, maintenance can be easily performed. However, when the kind and range of service is restricted, the distribution of service system becomes similar to the centralized management, and therefore the disadvantages of the centralized management system can be seen.

A user must change the server to be used depending on the desired service, and therefore, it is inconvenient when the user is unable to determine the server required from the service. This is not a problem for DNS because the server can automatically be searched by utilizing the hierarchical configuration of domain.

On the other hand, a technique of an information resource recommending function, known as social filtering or collaborative filtering has been developed in which a preferable information resource is recommended based on aecommendation by another person, or an evaluation value and action of other persons having the same preference. For example, Tapestry (Xerox Palo Alto Research Center, D. Goldberg, D. Terry) is a system that aids in selective reading of articles recommended by others from among numerous articles from Usenet News and a mailing list. In the same way, examples of similar former systems in which other users designate an evaluation value for articles and recommended articles having a greater value, include GroupLens (minesota Univ., J. Riedl, J. Konstan), which is a system for recommending Usenet News articles and Ringo (MIT, P. Maes, U. Shardanand), which is a system for recommending music albums.

But, since it is not guaranteed that the favorite of one field is similar even if a favorite of another field is similar, it is not always best to follow the action and recommendation of a particular person. In addition, since information about a favorite is centralized for management, the problem described in regard to the centralized management of the information of the search engine may be made apparent in regard to the management of favorite data.

As described above, problems that exist in the related art can be classified as follows.

In the directory service system, execution of registration requests often depends on manual operation by a manager, and therefore the manager tends to be heavily overloaded. As a result, it is likely that a search will be unsuccessful due to a mistake by the manager.

Ineffective HTML documents may be transferred since the robot program does not fully evaluate the contents of HTML documents, and, as a result, the load of traffic and load on the server tend to increase.

In order to keep the traffic low, frequency of activation of the robot program must be reduced. As a result, information collected is often immediately changed there is an increased possibility that the information obtained may already be invalidated.

Contents of information collected by a robot are probably not immediately reflected in a search result on an information resource provider side, even when it is not known to whom notification of the change of contents of service offered must be made, and such change of contents can be informed.

When a database of an information resource becomes large, a large number of results are output for the search. Therefore, a user cannot determine which information resource is most adequate. When a user does not have sufficient knowledge about the object information, such a determination becomes very difficult.

Since there is no guarantee that all favorites are similar, even if a particular favorite is similar, recommendation by a particular person is not always satisfactory.

SUMMARY OF THE INVENTION

It is therefore an object of the present invention an information resource which has solved the problems explained above by preventing common-placing of information and selecting the best information resource being the best through simultaneous advertisement of information resource using automated management of information regarding information resources, and returning the search result to a user via the advertisement of information resource by the information resource provider and inquiry from a user.

Objects of the present invention are achieved by a distributed search system connecting a plurality of computers on a network. Each of the plurality of computers includes a device for storing advertisement information including position information of an information resource, and a device for searching the storing device of each of the plurality of computers in response to a search request. In addition, each computer includes a device for accepting a request to register advertisement information in the storing device, and a device for transferring the advertisement information requested to be registered to the plurality of computers. The transferring of the advertisement information is determined by cost information given to the advertisement information.

Further objects of the present invention are achieved by a distributed search system connecting a plurality of computers on a network. Each of the plurality of computers includes a device for storing advertisement information including position information of an information resource, and a device for searching the storing device in response to a search request. The search request is accepted from searching device of the plurality of computers, and a search range corresponding to the search request is determined by cost information of the search request.

Further objects of the present invention are achieved by a plurality of searching apparatus having corresponding information resources, that connected to a network that includes an information resource provider. Each of the plurality of searching apparatus includes a storage device to store advertisement information that includes position information corresponding to the information resources, an advertisement processing device to accept registration of the advertisement information from the information resource provider, and a control device to store the advertisement information accepted for registration by the advertisement processing device in the storage device. The control device also transfers the advertisement information accepted for registration to the plurality of searching apparatus, and stores and transfers advertisement information transferred from the plurality of searching apparatus.

Still further objects of the present invention are achieved by a searching apparatus from among a plurality of searching apparatus having information resources, that processes a search request from an information resource searcher. The searching apparatus includes a storage device to store advertisement information that includes position information of the information resources, an interface device to provide a search result, having corresponding advertisement information, in response to the search request, and a control device to search the storage device in response to the search request. The control device also transfers the search request to the plurality of searching apparatus, searches the storage device in response to a search request transferred from one of the plurality of searching apparatus and transfers the transferred search request to the plurality of searching apparatus other than the one searching apparatus, and transfers resulting advertisement information to the information resource searcher or the one of the plurality of searching apparatus.

The above and further objects and features of the invention will more fully be apparent from the following detailed description with accompanying drawings.

BRIEF DESCRIPTION OF THE DRAWINGS

FIGS. 8A–8C are schematic diagrams showing an example of a search request according to a preferred embodiment of the present invention;

FIG. 10 is a schematic diagram showing a result of a search according to a preferred embodiment of the present invention;

DESCRIPTION OF THE PREFERRED EMBODIMENTS

Figure 1:
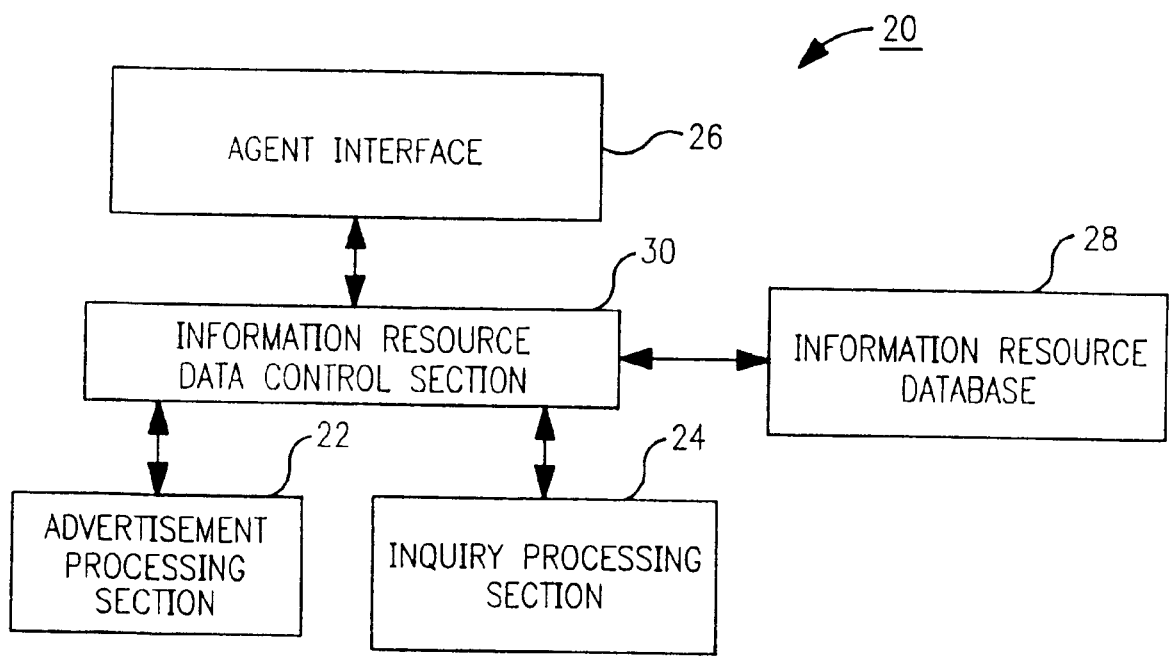
FIG. 1 is a block diagram of an information resource searching apparatus in a distributed searching system according to a preferred embodiment of the present invention.

A discrete agent 20 in a network that includes a plurality of agents, or "searching apparatus" in a distributed searching system according to a preferred embodiment of the present invention is illustrated in FIG. 1. As illustrated in FIG. 1, an advertisement processing section 22 accepts an advertisement regarding an information resource from an information resource provider for notification as required by the information resource provider. An inquiry processing section 24 accepts a search request from a user and returns a corresponding result. An agent interface 26 exchanges the advertisement, inquiry, and corresponding result with other agents (not shown). An information resource database 28 stores an advertisement sent from the advertisement processing section 22 and the advertisement received from the agent interface 26. An information resource data control section 30 stores the advertisement received from the advertisement processing section 22 and agent interface 26 in the information resource database 28, calculates a cost of the advertisement, and instructs processing, such as sending the advertisement to other agents via the agent interface 26 based on the calculated cost. The information resource data control section 30 retrieves the information resource database 28 or calculates the cost required for transmission of the search request for the inquiry from the inquiry processing section 24 and agent interface 26, and returns the inquiry to other agents through the agent interface 26.

Figure 2:
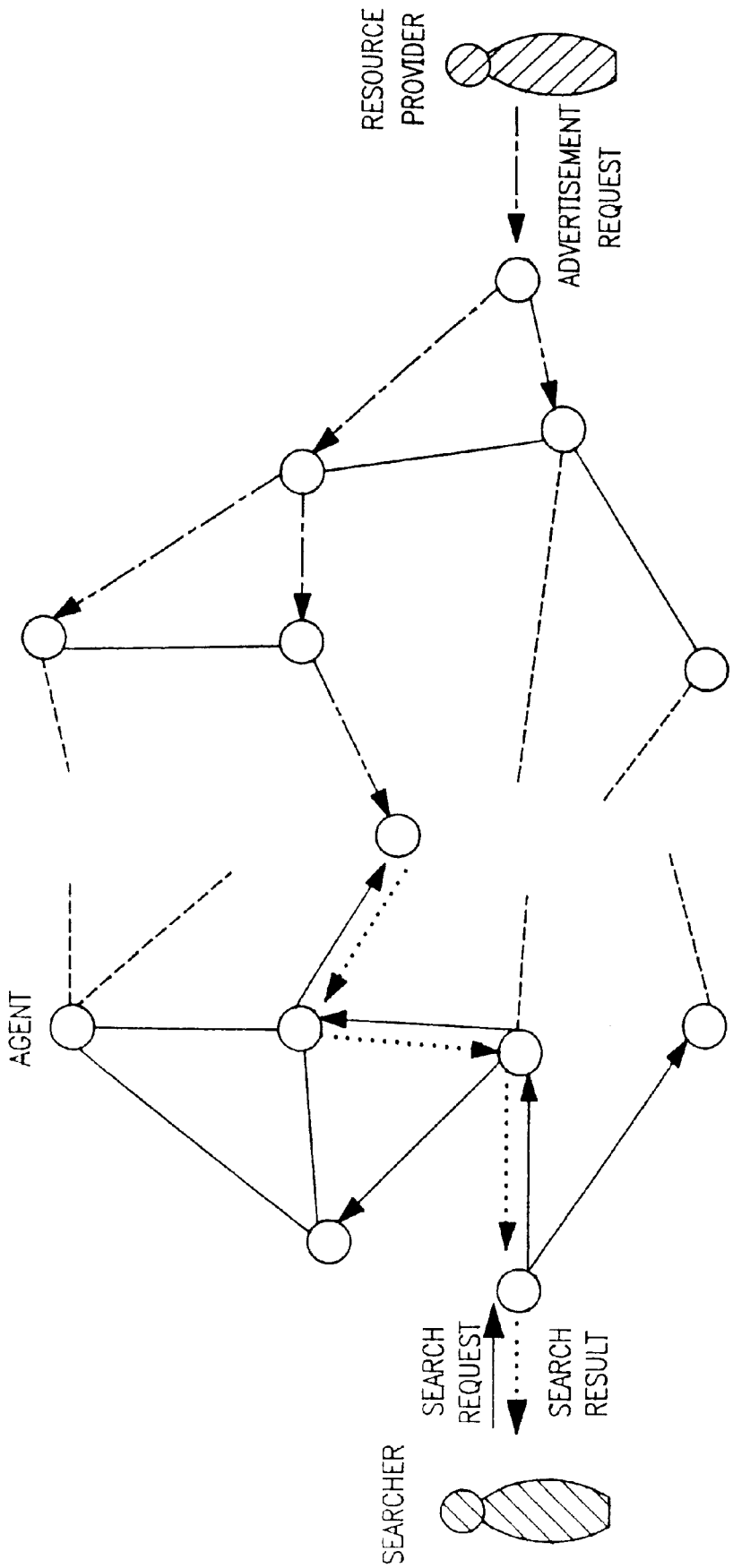
FIG. 2 is a schematic diagram of advertisement and search of an information resource in the distributed searching system of FIG. 1.

Advertisement and search of an information resource in the distributed searching system according to the preferred embodiment of the present invention is illustrated in FIG. 2. FIG. 2 is a schematic illustration of transmission and reception of advertisement and inquiry data in the system as a whole. In FIG. 2, each circle indicates an agent that executes an operation described below. Moreover, a solid line connecting the agents indicates that the connected agents can communicate with each other.

In a preferred embodiment of the present invention, a plurality of agents as described above form interconnected infrastructures in which the agents are connected with each other. Each of the agents informs the nearest agent of information regarding service provided by an information resource provider in the form of an advertisement. An agent which receives an advertisement stores the contents described in the advertisement in the information resource database 28 and sends the advertisement to other agents within a range of transmitting information that corresponds to a cost. The agent receiving the advertisement stores the advertisement for a constant period or "living period", and erases the advertisement when the living period has passed. As a result, old information is stored in the information resource database of the agent for only a predetermined period.

Figure 3:
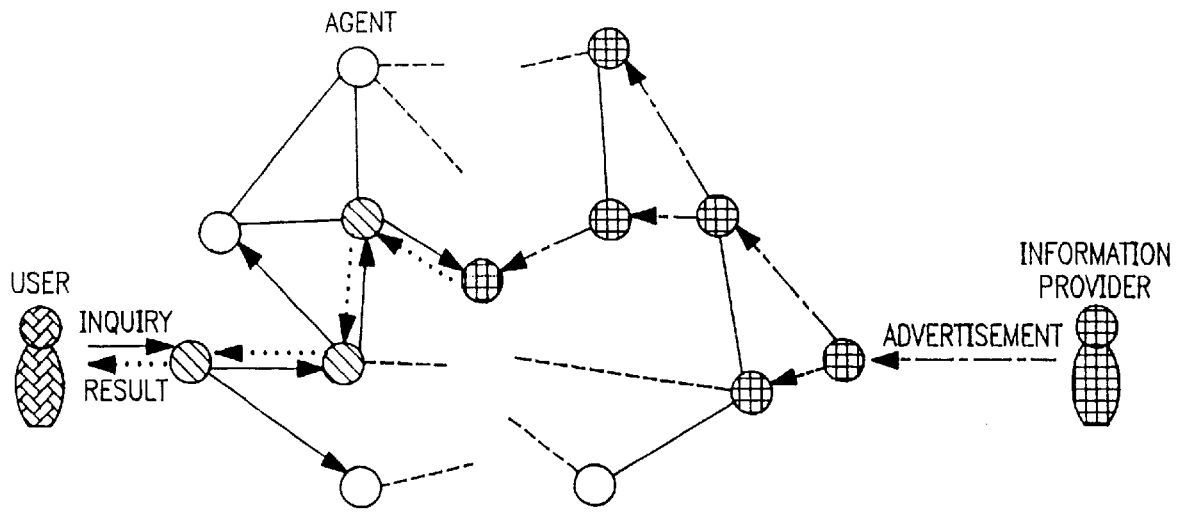
FIG. 3 is a schematic diagram of propagation of information in regard to an information resource in a distributed searching system according to a preferred embodiment of the present invention.

As illustrated in FIG. 3, when a user generates an inquiry, the inquiry is sent, like the advertisement, to an agent within a range of transmission corresponding to a cost, and the agent returns a result to the user within a time that the inquiry reaches the agent having the relevant data. When returning the result, inverse tracing is performed along a path that includes agents to which the inquiry has been transferred so that each agent stores the result. As a result, the advertisement can be propagated outside of the range of the first advertisement by the information resource provider.

Figure 4:
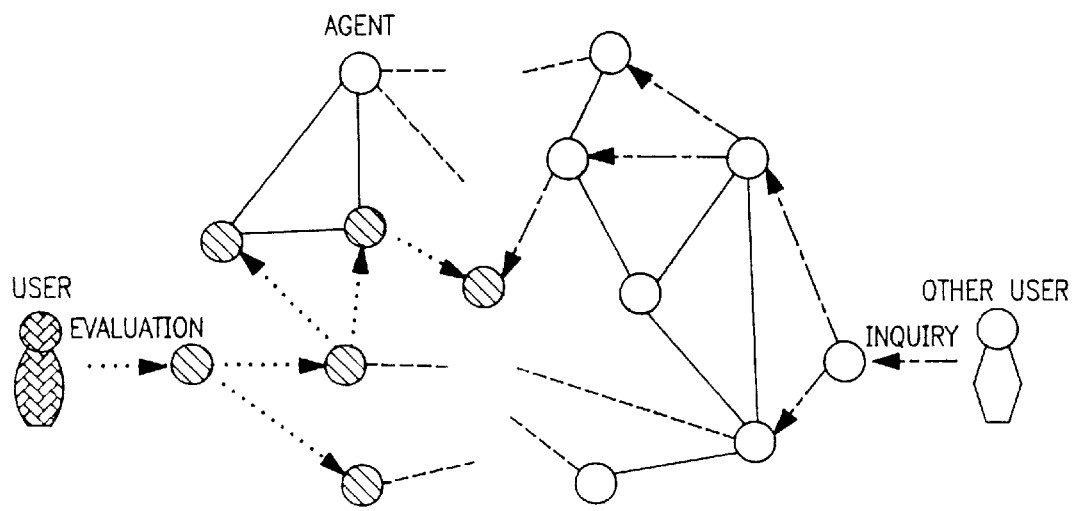
FIG. 4 is a schematic diagram of propagation of evaluation of an information resource in a distributed searching system according to a preferred embodiment of the present invention.

As illustrated in FIG. 4, when a search is successful, a user feeds back an evaluation to propagate a result, in a manner similar to the advertisement made by the information resource provider, when a satisfactory result is obtained using the information resource. When an agent receives a positive evaluation regarding the information resource, the agent extends the living period of the information regarding the information resource. As a result, an advertisement regarding a satisfactory information resource is stored in the information resource database for an extended period of time. On the other hand, when an agent receives a negative evaluation, the agent shortens the living period of the information resource to make it difficult to obtain the information during a search.

Therefore, since each agent communicates only with neighboring agents, and transmits only advertisement and information specified by the search request, communication costs are lowered. Moreover, achievement of use by a user is reflected in the living period in the database, and advertisement of an information resource which is frequently used with positive results remains within the database for an extended period of time, compared with other advertisements and is propagated to the agents in a wider range. As a result, the advertisement is easily found by another user at the time of the search.

Figure 5:
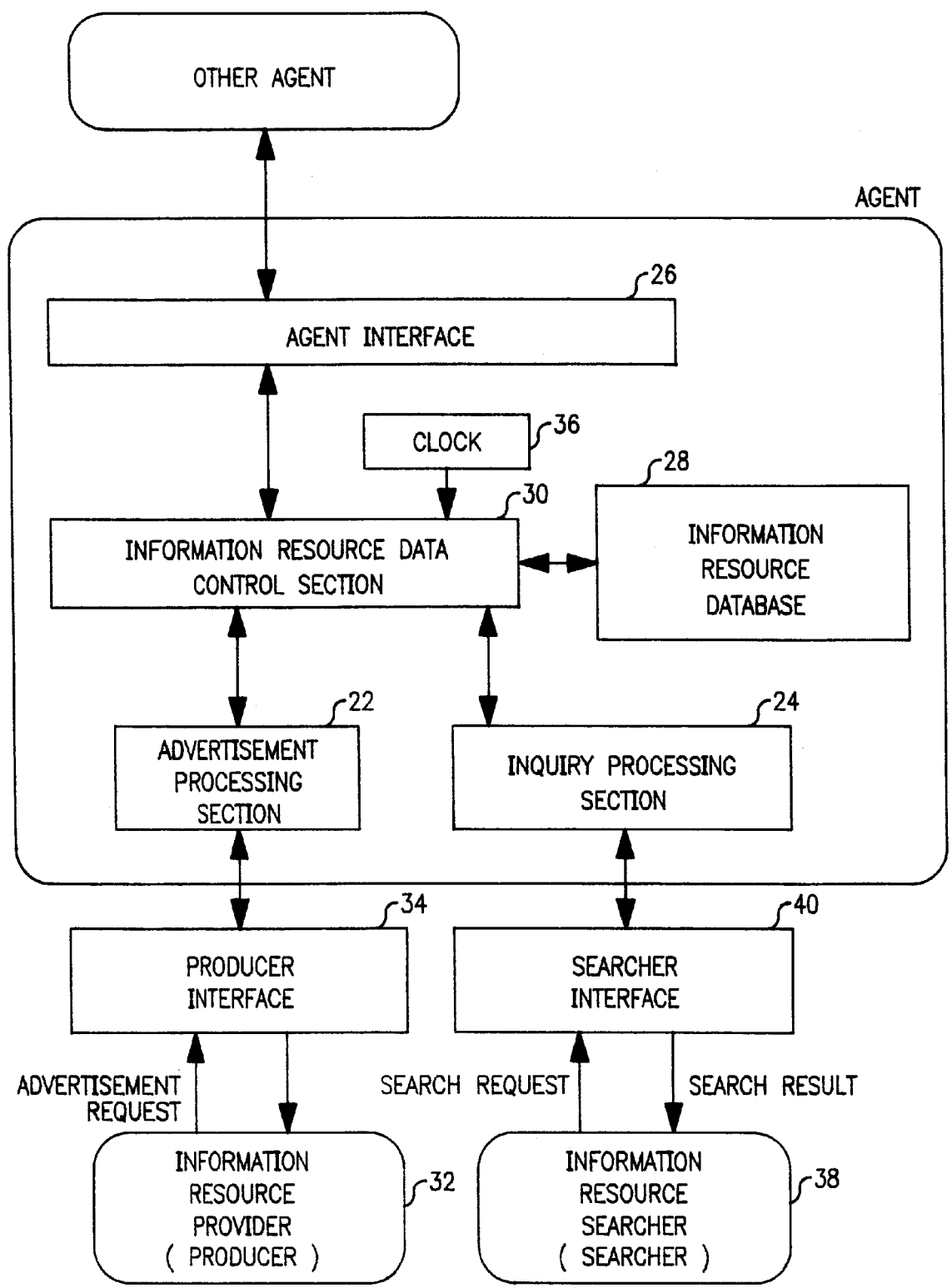
FIG. 5 is a block diagram of an information resource searching apparatus according to a preferred embodiment of the present invention.

An information resource searching apparatus according to a preferred embodiment of the present invention is illustrated in FIG. 5. The information resource searching apparatus of FIG. 5 includes distributing and searching for information resource information, according to a preferred embodiment of the present invention. Elements in FIG. 5 that are similar to those shown in FIG. 1 are designated by like reference numerals. Each agent shown in FIG. 1 functions as a server of a provider, and is connected to the information resource providers, information resource searchers, or information processing apparatuses, such as personal computers, and the other agents or servers of the other providers, for the purpose of communication.

A process related to an advertisement according to a preferred embodiment of the present invention will be explained in reference to FIGS. 5–7. As illustrated in FIGS. 5 and it 7, an information resource provider 32, or producer, initially transmits information regarding service of an information resource provider to the nearest agent in the form of an advertisement through a producer interface 34.

Figures 6, 7:
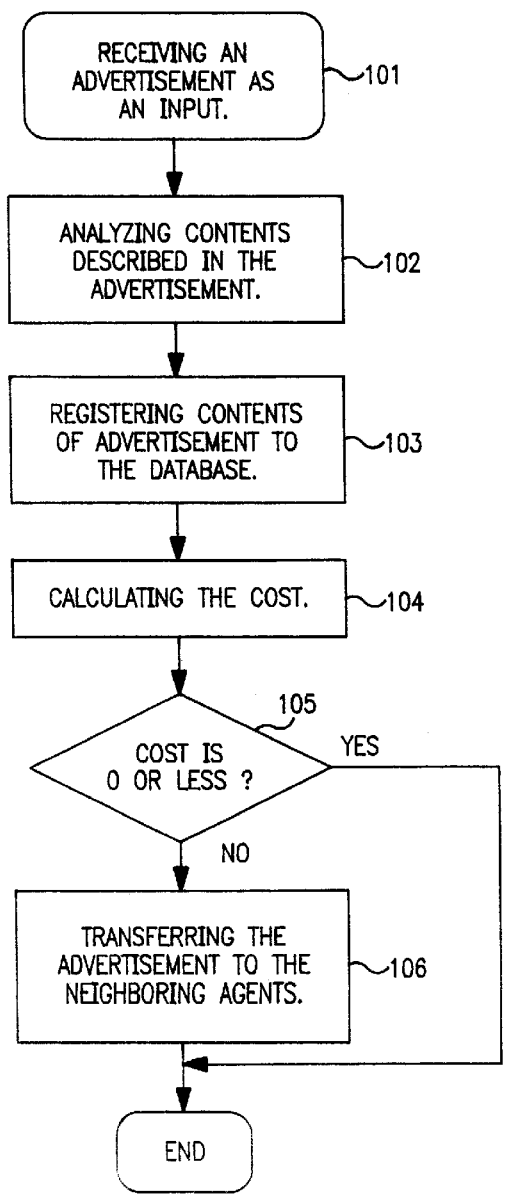
FIG. 6 is a schematic diagram showing an example of an advertisement according to a preferred embodiment of the present invention.
FIG. 7 is a flowchart showing a process of advertisement in a searching apparatus of the present invention.

As illustrated in FIG. 6, the advertisement includes a number of items along with information corresponding to the items. More particularly, the advertisement includes an "ID" item, or code to identify the advertisement given in the form of a class code, such as P, which indicates the advertisement request. A "From" item includes information for identifying a name of an advertisement sender, such as a mail address used for making inquiry from an information user, or as verification data to prevent alteration of the contents of the advertisement. A "Subject" item includes a name of the information resource provided, and a "Keywords" item includes keywords related to the type of information or service provided.

A "URL" item includes position or field information corresponding to information provided for searching the position information. However, it is also possible in an alternate embodiment of the present invention that information corresponding to a key used by another searching method is described in this item, rather than the URL.

A "Maintainer" item includes information for identifying an information resource manager, which may be same as a name of a sender of the advertisement. A "Cost" item includes parameters for limiting a range of the advertisement, such as a maximum number of agents used for transmission, or time used for advertisement, or cost, when a charging system is introduced in regard to communication and use of a computer. A "Date" item includes a date and time for reception of the advertisement by the agent, and a "Path" item includes a column of IDs of agents through which the advertisement has been relayed, to prevent repeated transmissions of one advertisement to the same agent. For example, the advertisement illustrated in FIG. 6 is relayed to agents having IDs A, B and C.

Information contained in the ID, From, Date, and Path items is given automatically by the advertisement processing section 20 and therefore is not required to be provided by the information resource provider.

In step 101 of the advertisement process of FIG. 7, an advertisement transmitted from the producer interface 34 is received by the advertisement processing section 22. In step 102, the advertisement processing section 22 analyzes the contents of the advertisement, fetches a field of automatically given items (the ID, From, Date, and Path items), and sends the advertisement to the information resource data control section 30.

A living period of the advertisement is determined, and in step 103, contents of the advertisement are stored in the information resource database 28. The information resource database 28 records advertisement information corresponding to the information resource, namely, information such as URL and so forth, for obtaining the information resource. It should be noted that, while the information resource itself is not registered in the information resource database, a preferred embodiment for registration of the information resource itself is not excluded from the present invention.

The information resource data control section 30 makes reference to a clock 36, and deletes an advertisement which has extended beyond a set living period from the information resource database 28. In step 104, the information resource data control section 30 calculates a cost required by the advertisement, and in steps 105 and 106, transmits the advertisement to other agents through the agent interface 26 when there is an allowance still remaining in the available cost. The cost may be set on the basis of time required for completion of the advertisement from issuance of the request, communication expense, and expense required to use the database. When the advertisement is transferred to the other agents, the cost information may be replaced with newly calculated cost information that is obtained by subtracting the actual cost from the cost information.

In the distributed searching system of the present invention, advertisements transferred from other agents are also registered in the database, and their costs are calculated. When the cost does not equal zero, the advertisements are transferred to the other agents, and steps 101, and 103 to 106 of FIG. 7 are executed.

An existing broadcast in which a range of advertisement is not limited can be realized by placing no limitation on the cost.

Next, a process corresponding to an information search according to a preferred embodiment of the present invention will be explained in reference to FIG. 5 and FIG. 9.

Figure 9:
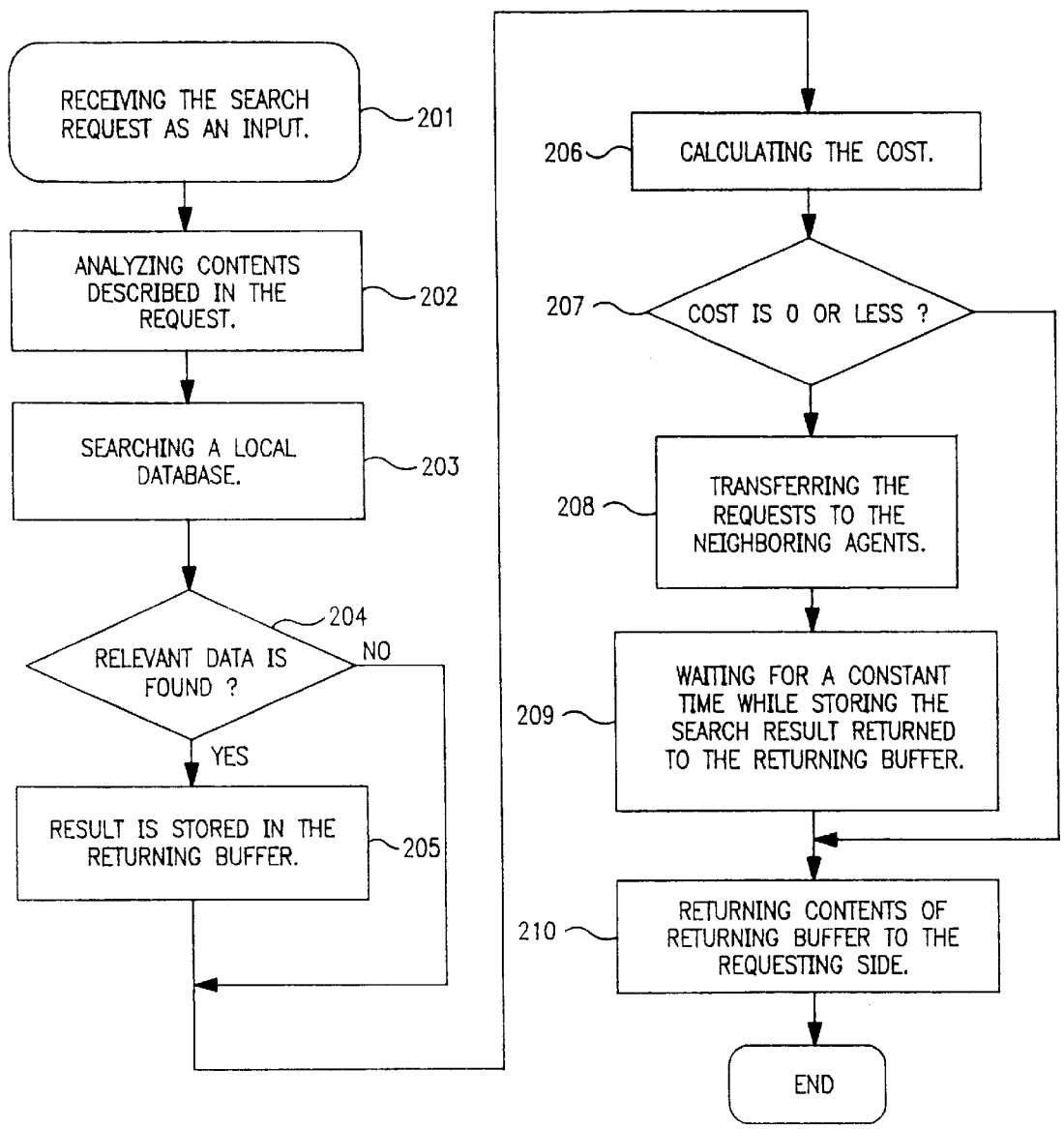
FIG. 9 is a flowchart showing a search process in the searching apparatus according to a preferred embodiment of the present invention.

In step 201 of FIG. 9, an information searching side, or resource information searcher 38, issues a search requirement, or search request to the inquiry processing section 24 via a searcher interface 40. As illustrated in FIGS. 8a–8c, the format of the search request is similar to the format used corresponding to the advertisement illustrated in FIG. 6. The known items in the request are filled, leaving the items known by the search process as vacant items. In this way, information contained in the ID, From, Date, and Path items are not filled by the searcher but are automatically filled by the inquiry processing section 24. The ID item is given a code Q to indicate a search request.

In this way, various search methods can be used. As illustrated in FIG. 8a, for example, keywords are designated, but the URL and Subject items are left vacant so that a name of an information resource and URL are searched in relation to the designated keywords.

As illustrated in FIG. 8b, the URL is designated in order to determine whether the service is actually provided and to check the contents of the service, while the Subject and Keyword items are left vacant so that the Subject and Keywords are searched.

As illustrated in FIGS. 8a and 8c, in order to establish cooperation of the same resource providers, Subject and Keywords items are designated, and the Maintainer item is left vacant in order to search the manager of the information resource assumed to have a certain relation.

In step 203, illustrated in FIG. 9, after receiving the search request, the inquiry processing section 24 sends the search request to the information resource data control section 30 which analyzes the request to search the information resource database 28 based on the request.

When a relevant result or search result is found, the search result is returned to the request sender via the inquiry processing section 24 and searcher interface 40 in step 204 and step 205.

The search result, which is illustrated in FIG. 10, includes an ID field that identifies the response to the search request issued which is given a code R to indicate the search result.

The search result is returned by inversely tracing the route used for transmission of the search request, and the route is indicated in a path field. A value of the path given to they search request directly becomes the Path of the returning format when the returning format of the search result is generated corresponding to the search request. Thereafter, the agent ID in the final field of the Path is deleted each time the result passes the agent, and the returning format is transferred to the agent. Finally, when the Path becomes vacant, the search result is returned to the agent which generated the search request.

As illustrated in FIG. 10, a "Date" field includes a date and time for generation of a return format of the search result, and a search result is indicated in a "Result" field.

Thereafter, a list of resource information of the search result is continued, which means that each field of the information regarding the resource information indicated here is the same as the advertisement. When there is no result matched with the search result, the field is left vacant.

As described in reference to the advertisement, cost is calculated by the information resource data control section 30 step 206 of FIG. 9. When an allowance remain in the available cost, the search request is sent to other agents via the agent interface 26 and the collected results are returned to the information searcher. Since a certain amount of time, dependent upon a characterization of the network, is necessary until the search result is returned from the other agent, or server after a constant period has passed while the search result to be returned is stored in a returning buffer, contents of the returning buffer are returned to the request issuing side in steps 207 to 210. Usually, the search result compensates, similar to the format of the advertisement, for the items corresponding to the search object among the search request with the relevant data.

In addition, when a request is received from another agent, through agent interface section 26, the agent searches for a suitable data in its database first, similarly to the above case. An then, the cost is not 0, the search request is transferred to the other agent. Finally, the agent replies to the agent which has sent the search request with search results through agent interface section 26.

Both time and cost can be considered as described above in reference to the advertisement of the information resource. In addition, the search request can be sent to all agents without any limitation on the search range, by eliminating the cost limitation. On the other hand, one agent may be designated as the object of a search by minimizing the search range.

Figure 11:
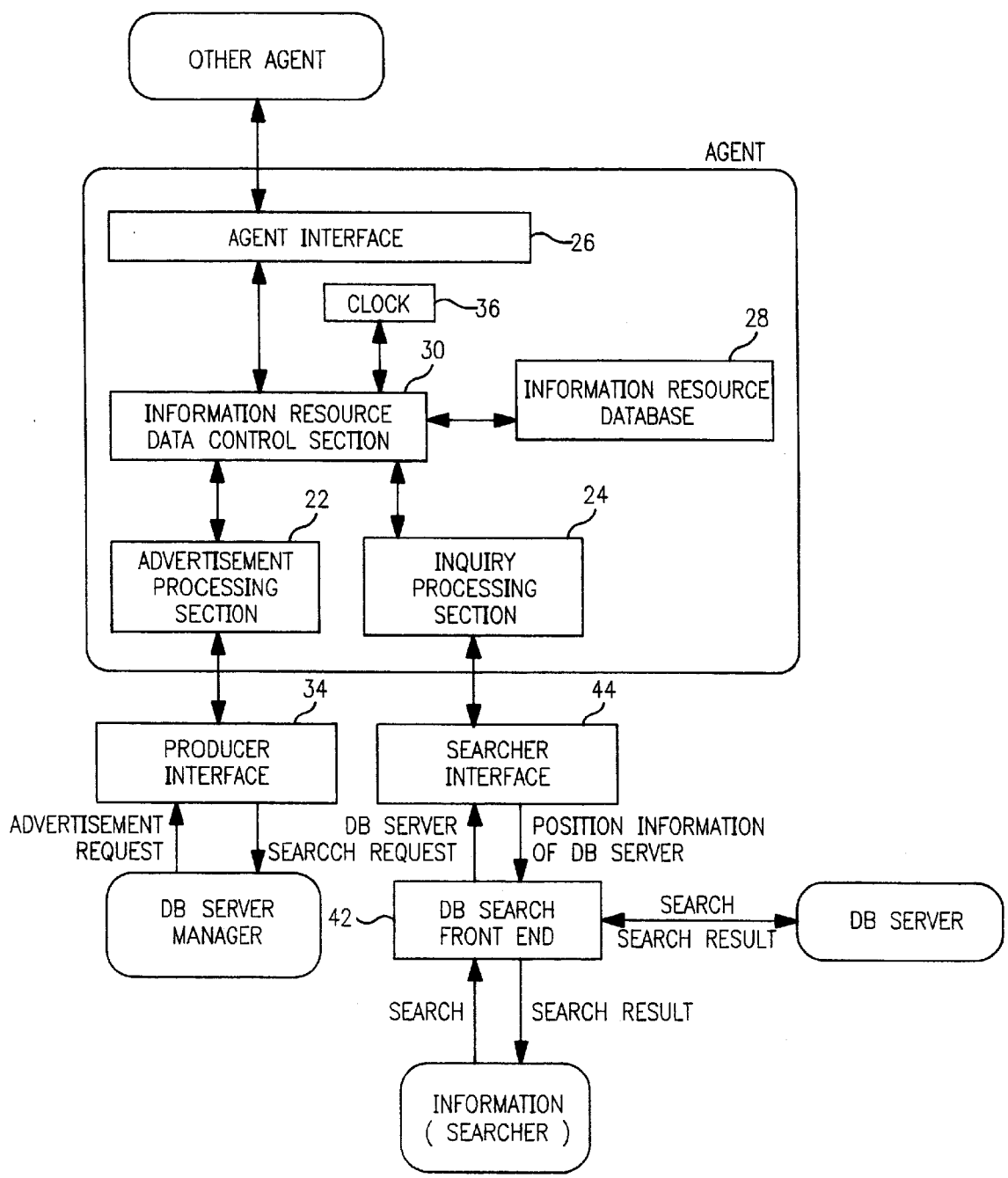
FIG. 11 is a block diagram showing a configuration of a searching apparatus in a large scale distributed database according to a preferred embodiment of the present invention.

A second preferred embodiment of the present invention is illustrated in FIG. 11. The first embodiment described above discloses a basic configuration with which an agent can obtain advertisement information, while the second preferred embodiment and a third preferred embodiment described below disclose a configuration for searching and obtaining an information resource corresponding to search request based on advertisement information obtained. More particularly, the second preferred embodiment is suitable for a large scale distributed database. While FIG. 11 mainly shows a logical configuration of the present invention, from a physical point of view, a database search front end 42 is capable of directly giving information to each agent, or of using the server independent of the agent.

Moreover, in both the second preferred embodiment and the third preferred embodiment, a manager of a database server issues the advertisement request. Although practical contents of the information resource are not defined in the first embodiment, the information resource is provided by the database in the second and third embodiments, and therefore it can be assumed that the information resource advertisement provider may be designated as a database manager.

Figure 12:
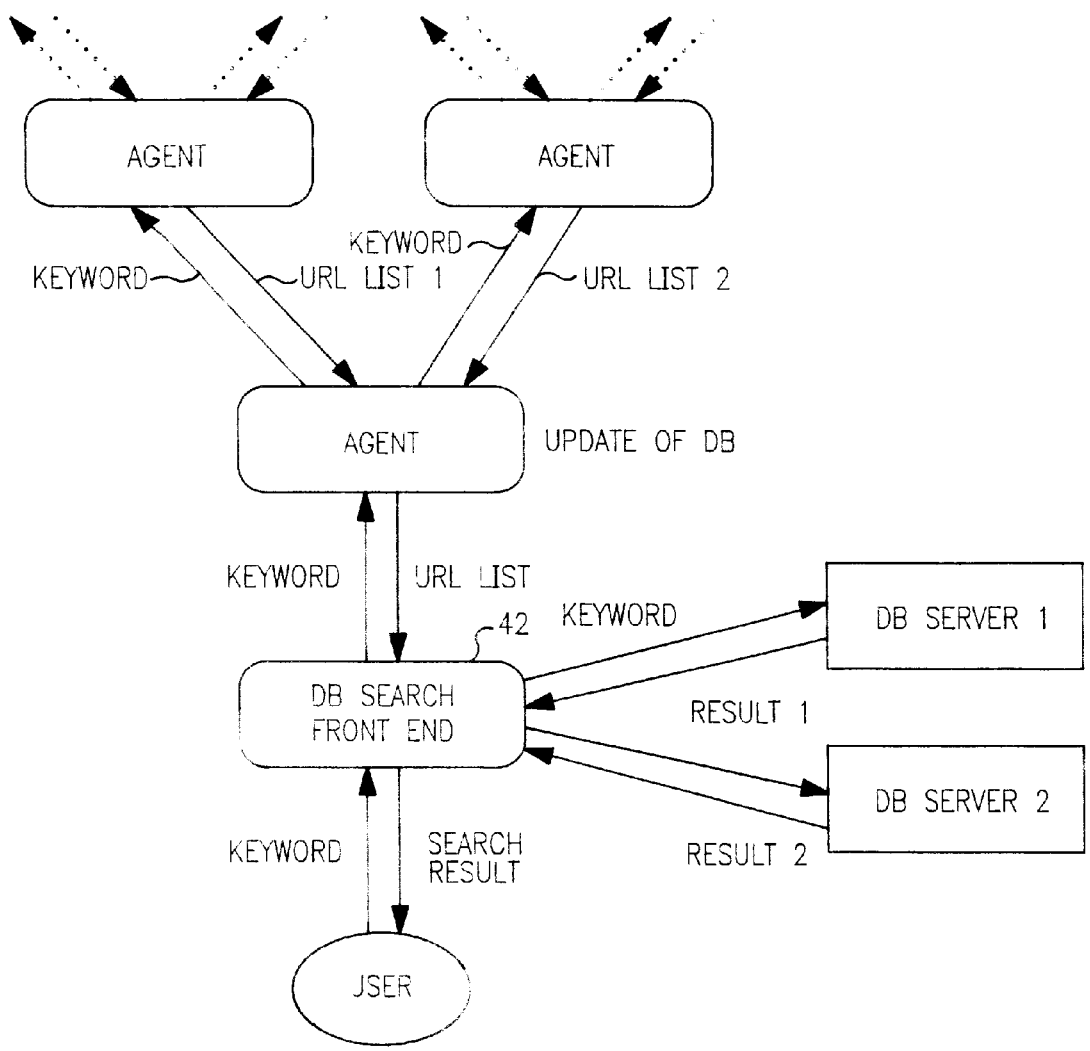
FIG. 12 is a schematic diagram for explaining operation of a large scale distributed database of the searching apparatus of FIG. 11.

FIG. 12 is a schematic diagram of a series of operations of a large scale distributed database according to the second preferred embodiment. As illustrated in FIG. 12, advertisement information obtained by searching the advertisement information is collected by a DB search front end 42. The DB search front end 42 searches the database based on a URL included in collected advertisement information in order to obtain the information resource.

As illustrated in FIGS. 11 and 12, a user gives some keywords corresponding to information to be searched to the database search front end 42, which in turn asks for position information of a database having the information regarding the keywords to a nearest agent through a searcher interface 40. An agent receiving the search request executes the search corresponding to the operations described above in reference to the first preferred embodiment.

Each agent compares the search result returned from the other agent with relevant data of the information resource contained in the database 28, including date and time data in: the Data field included in the search result. If the search result includes newer data, the data in the information resource database 28 is updated with the new data. When position information T of the database server is obtained, the database search front end 42 selects several desired database servers from the result obtained, and transfers the keyword to the selected database servers for execution of the search of the database.

Several possible embodiments can be used for selecting the server. For example, the servers may be selected at random or the server having the configuration similar to that of the network may also be selected. In addition, it is also possible that information corresponding to a scale of the database is included in the advertisement format, and servers having a larger scale are selected preferentially, based on the information. Moreover, it is also possible to select the servers with reference to evaluation information by combining a fourth and fifth preferred embodiment, which will be explained below.

Finally, search results from database servers are integrated and then returned to the user.

Figure 13:
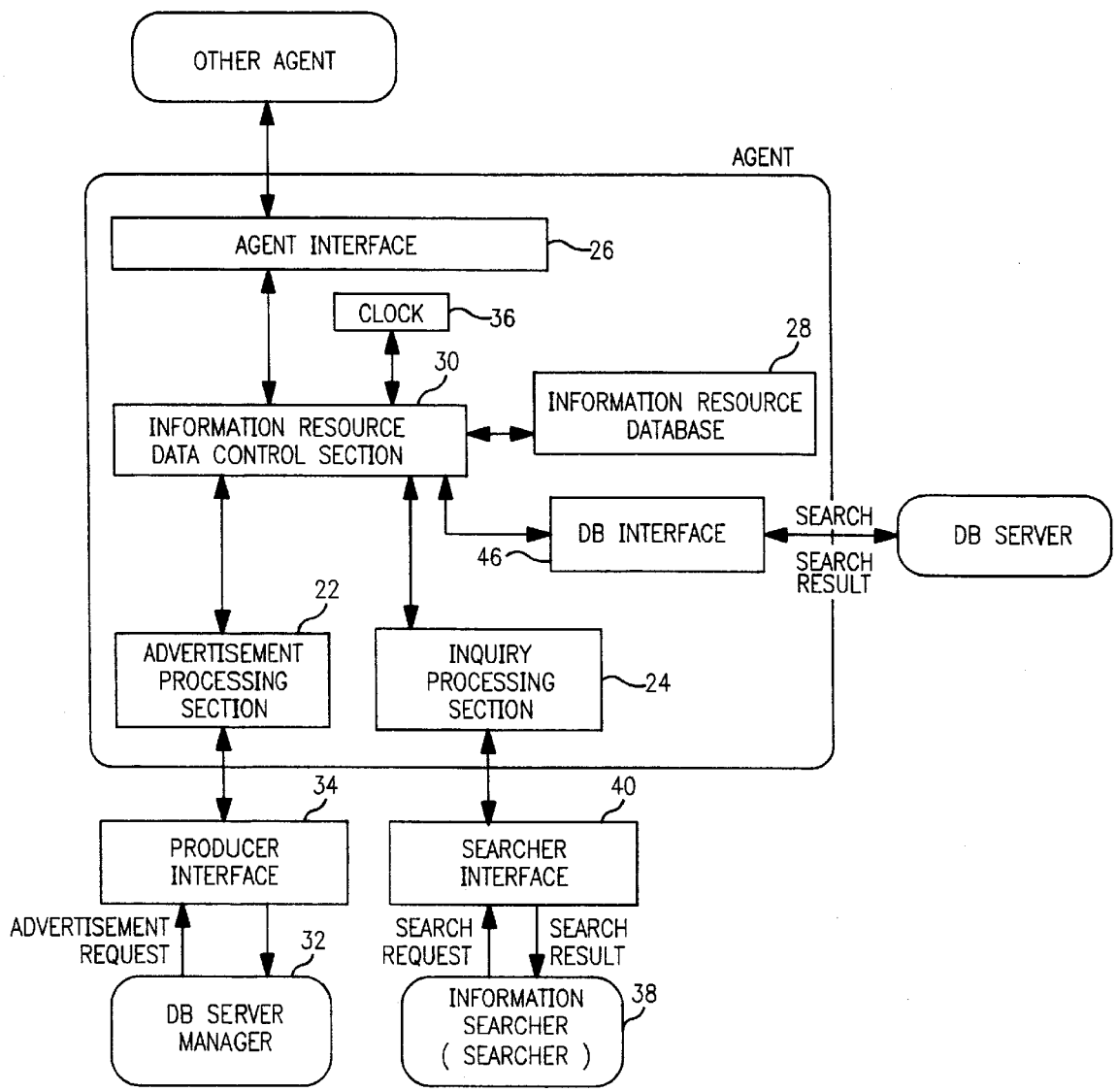
FIG. 13 is a block diagram showing a configuration of a searching apparatus in a large scale distributed database according to a preferred embodiment of the present invention.

A third preferred embodiment of the other large scale distributed database is illustrated in FIG. 13. In the second preferred embodiment described above, the advertisement information is collected to detect the position information (URL) of the database and thereafter the information resource is obtained based on the collected URL. In the third preferred embodiment, as illustrated in FIG. 14, when an agent executes a search of advertisement information, the agent also executes a search of the database server based on position information included in the advertisement information obtained, and returns the information resource to a request issuing agent, or searcher interface.

A database server manager initially issues an advertisement of a database server, as described above. An information searcher requests a search of the database through the searcher interface 40. This request is arranged in an adequate format by the inquiry processing section 24 and is then transferred to the information resource data control section 30.

The information resource data control section 30 searches the information resource database 28 to obtain position information of the database server as a search object. If information corresponding to the relevant database server is found, the database server executes the search through a database interface 46. When an allowance in the cost still remains the search request is also issued to other agents through the agent interface 26, asking for a return of the search result. On the other hand, when the database server to which search request is issued has returned the result, the result is temporarily stored until the result of the other agent can be obtained during a waiting condition. When all search results are returned, the search results are integrated and then returned to the search requesting side.

Figure 14:
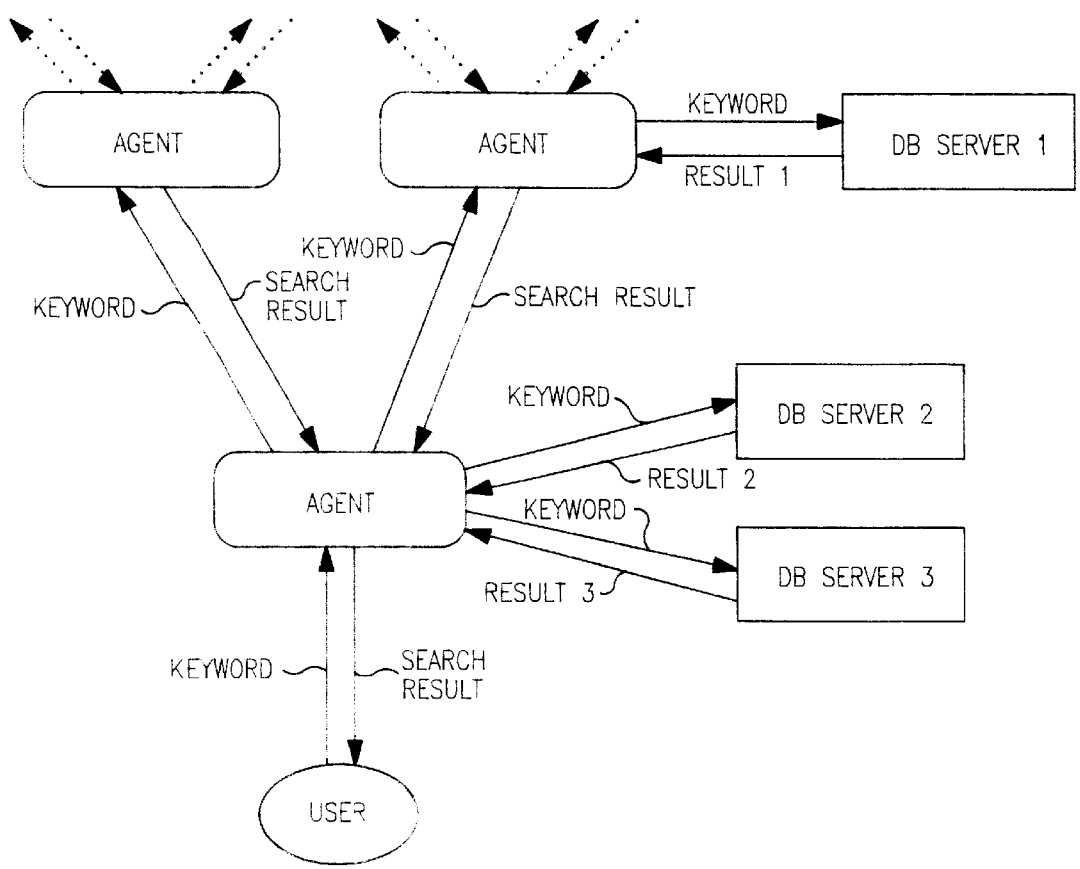
FIG. 14 is a schematic diagram of operation of the large scale distributed database of the searching apparatus of FIG. 13.

In the searching apparatus according to the third preferred embodiment illustrated in FIGS. 13 and 14, since it is possible that a certain database server will receive the same search request from a plurality of agents, it is desirable to avoid repetition of the same search in which an ID is previously given to the search request. As a result, the database server stores the search history and the ID, and returns an "already responded" answer to the request issuing side for repeated search requests.

Figure 15:
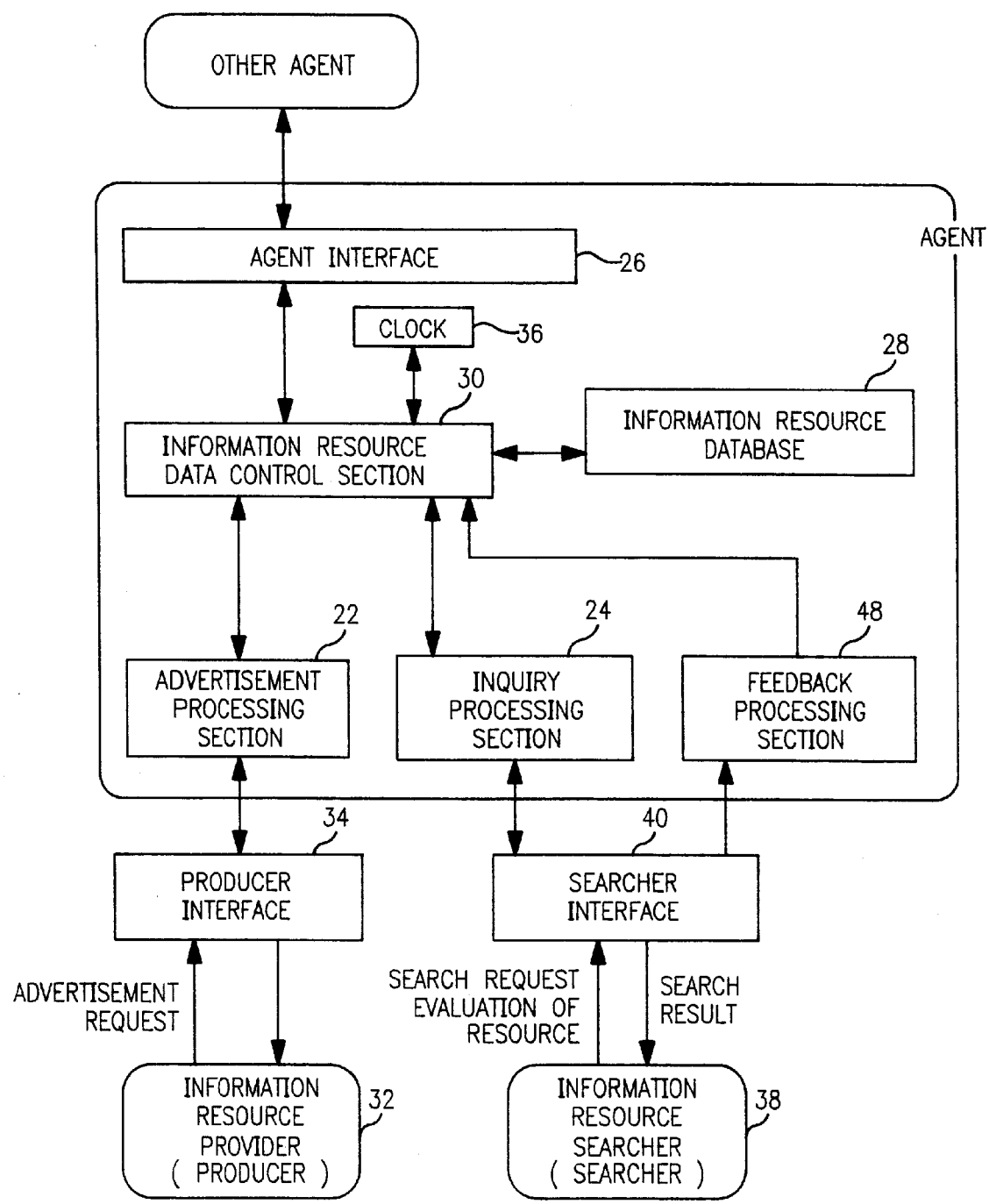
FIG. 15 is a block diagram showing a configuration of a searching apparatus in a large scale distributed database according to a preferred embodiment of the present invention.

In the third preferred embodiment, the information regarding the information resource obtained from the agent is basically given, in one way, from the information resource provider side, but it is also possible, as in the case of a fourth preferred embodiment illustrated in FIG. 15, that the information resource obtained as the search result is actually used, and its positive or negative information about its usefulness is fed back to the agent. In this way, all users are capable of effectively using the information resource.

For example, when a user actually uses the information resource, an advertisement is issued to delete the relevant information resource from the information resource database 28 of each agent for the information resource which is proved to be disabled for use, in order to prevent the use of such ineffective information resource by other users. Moreover, when an information resource is matched with the request of a user, an advertisement is issued for the data control to extend the living period, and as a result, the other users can easily identify the information regarding the information resource.

As illustrated in FIG. 15, feedback information corresponding to evaluation of an information resource is transferred to a feedback processing section 48 through the searcher interface 40. This information is then converted to an adequate format, and is then transferred to the information resource data control section 30 for the purpose of advertisement for propagation to the other agent. The information resource data control is section 30 that receives the advertisement, updates, depending on the evaluation, the entered living period of the relevant information resource in the information resource database 28 and transfers the evaluation to the other agents through the agent interface 26 as long as an allowance remains in the cost, as the case of the ordinary advertisement.

Figure 16:
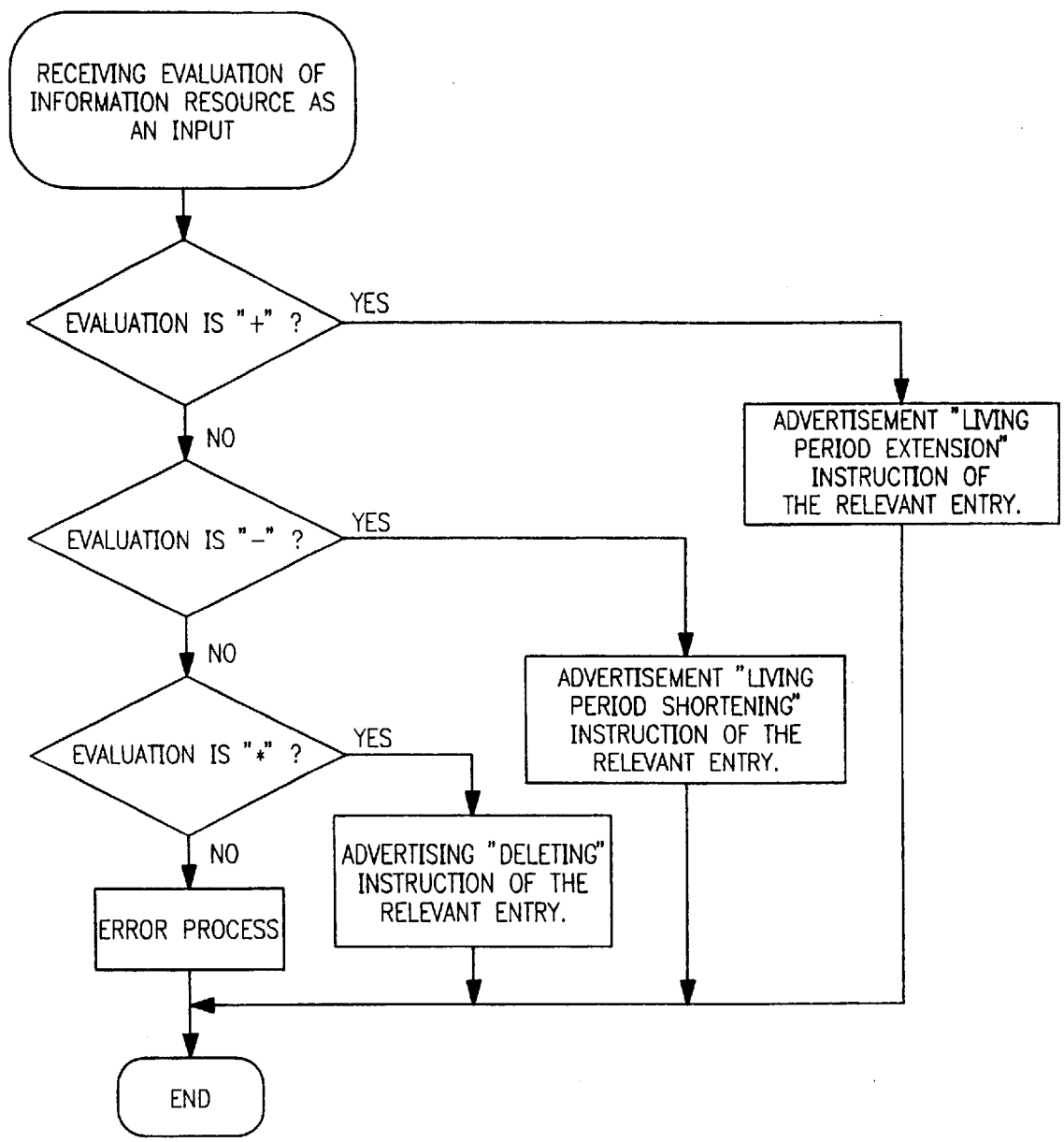
FIG. 16 is a flowchart showing a process in a feedback processing section of FIG. 14.

The process flow of the feedback processing section 48 is illustrated in FIG. 16. As illustrated in FIG. 16, evaluation by a user is classified into three steps of "+" (satisfied), "−" (dissatisfied) and "*" (disabled). For each respective evaluation, an instruction is issued to the information resource data control section 30 announce an advertisement to request an extension, a shortening, or a deletion of the living period of the entry of the relevant information resource in the database.

In the third preferred embodiment, the living period of the advertisement in the information resource database 28 is used to measure the quality of the information resource. It is also possible that other evaluation standards, such as a number of utilization times, and freshness of databases, can be given priority, without relation to the living period, and sorted in order to return the search result. In this way, the information resource provider makes the advertisement to record an attribute of an evaluation regarding the information resource at the time of recording information about the information resource in the information resource database 28 in each agent.

When information about the same information resource is returned with different evaluation values, from different agents, the evaluation value of the agent organization as a whole is calculated, for example, by obtaining a mean value.

Finally, the searcher interface 40 does not present all search results to the information searcher, but presents only the best results by giving sequential order with reference to the evaluation criterion of the searcher.

In the fourth preferred embodiment illustrated in FIG. 15, the evaluation value regarding the information resource of each agent is collected by the search of the information searcher, and is then used by the searcher to select the information resource. It is also possible that calculation of the evaluation value is conducted individually, without relation to the search, and the information resource provider can utilize such evaluation value to ascertain social evaluation of the information resource disclosed by the information resource is provider.

Figure 17:
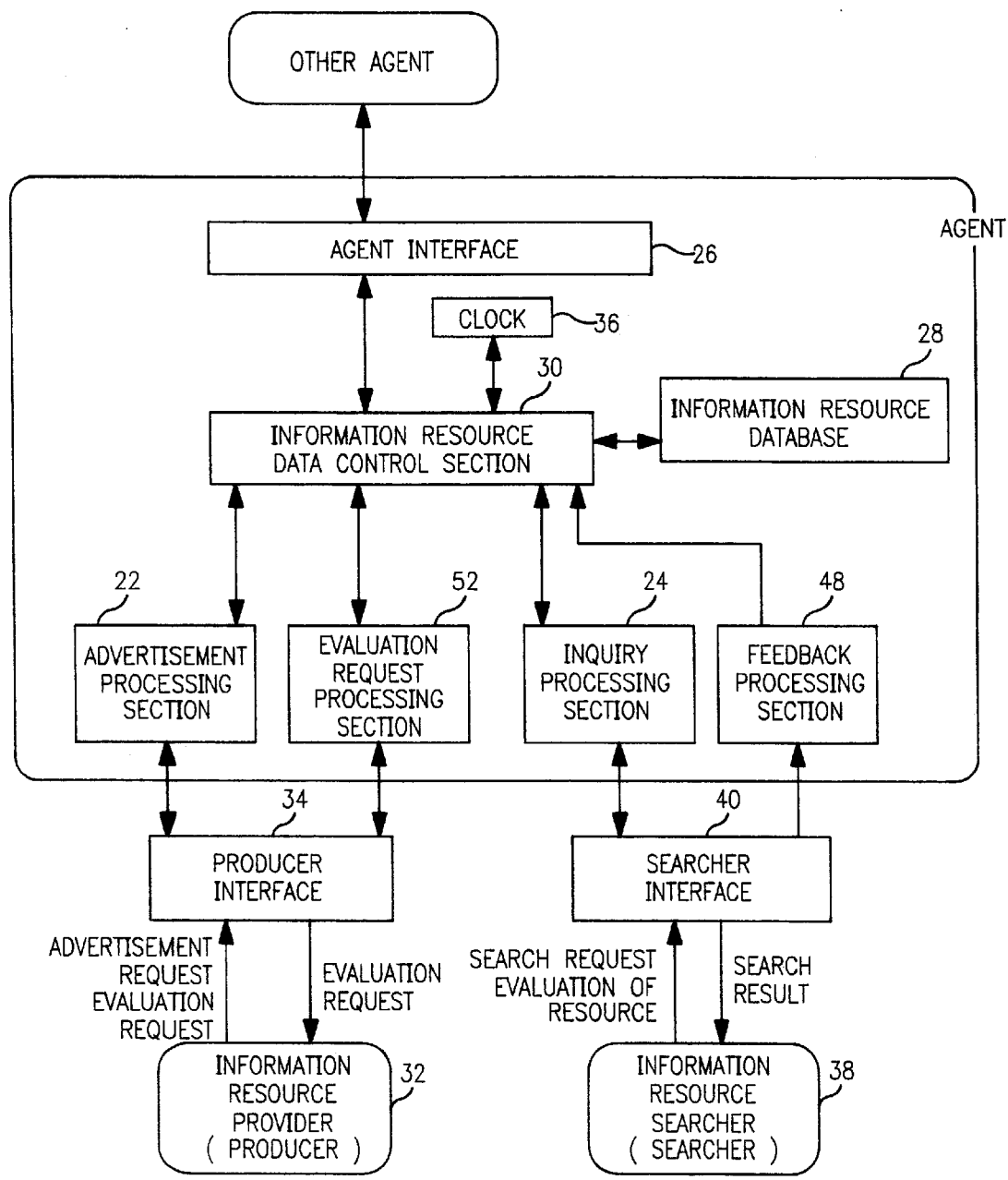
FIG. 17 is a block diagram showing a configuration of a searching apparatus in a large scale distributed database according to a preferred embodiment of the present invention.

FIG. 17 illustrates an information resource searching system that collects evaluation values of the information resource provided by the information resource provider 32. The producer interface 34 accepts the evaluation request in addition to the advertisement request from the information resource provider 32, and verifies the information resource provided, if necessary, when it has received the evaluation request. The producer interface 34 then sends contents of an evaluation request to an evaluation request processing section 52. The evaluation request processing section 52 analyzes the contents and sends the evaluation request to the information resource data control section 30.

The information resource data control section 30 searches the evaluation value of the relevant information resource of the information resource database 28 and transmits the evaluation request to other agents through the agent interface 26, in the same way as the advertisement and search of the resource information. The evaluation value that is returned as a result of the search is collected in the information resource data control section 30 and is then returned to the information resource provider through the evaluation request processing section 52 and producer interface 34.

Figure 18:
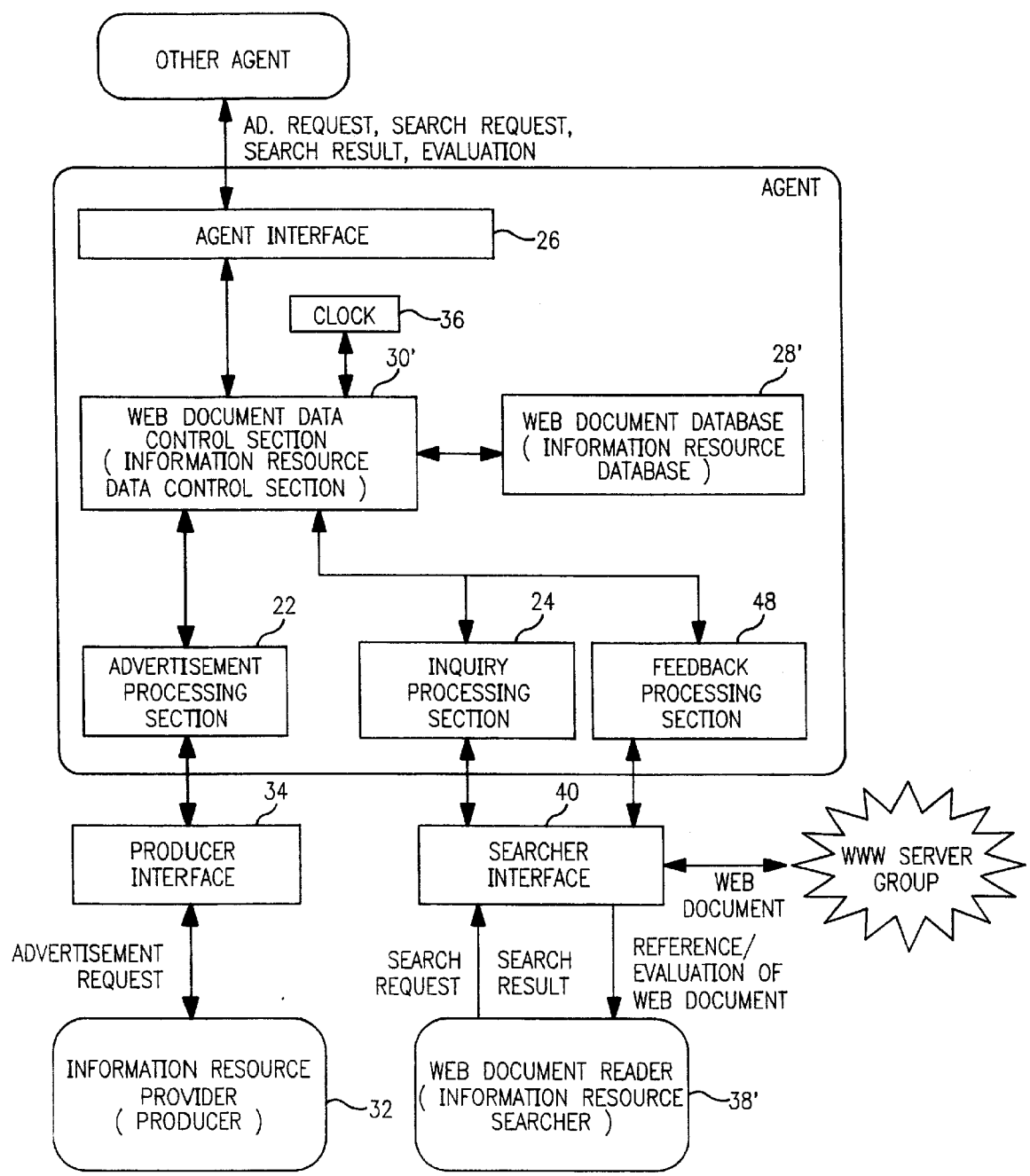
FIG. 18 is a block diagram of a searching apparatus according to a preferred embodiment of the present invention.

A distributed type search engine for management and search of information in regard to a Web document according to sixth embodiment is illustrated in FIG. 18. The same configuration of elements as those in each of the previously described embodiments are designated by the same reference numerals in FIG. 18.

During normal operation, a Web document producer transfers information corresponding to a Web document produced to a nearest agent in the form of an advertisement request through the producer interface 34. The practical format of the advertisement request is similar to that in each of the embodiments explained above.

Based on advertisement information regarding the Web document transmitted from each embodiment explained above, the advertisement processing section 22 adds various pieces of information, such as registration date and time, living period of information and initial value of the advertisement cost and evaluation value, and then transfers the information to a Web document data control section 30'. The Web document data control section 30' is basically identical to the information resource data control section 30 described above, but since the information resource of the sixth preferred embodiment is a Web document, such naming has been used for the Web document data control section. For the same reason, a Web document database 28' is identical to the information resource database 28 described above.

In the Web document data control section 30', as in the case of each embodiment explained above, the Web document information obtained by the advertisement is registered in the Web document database 28' to execute calculation of cost required by the advertisement. If an allowance remains in the available cost, the advertisement is also transferred to the other agent through the agent interface 26. Moreover, Web document information outside an effective period of the clock 36 is deleted from the Web document database 28'.

Moreover, when an advertisement request is accepted from other agents, the advertisement request is transferred to the Web document data control section 30' through the agent interface 26.

Figure 19:
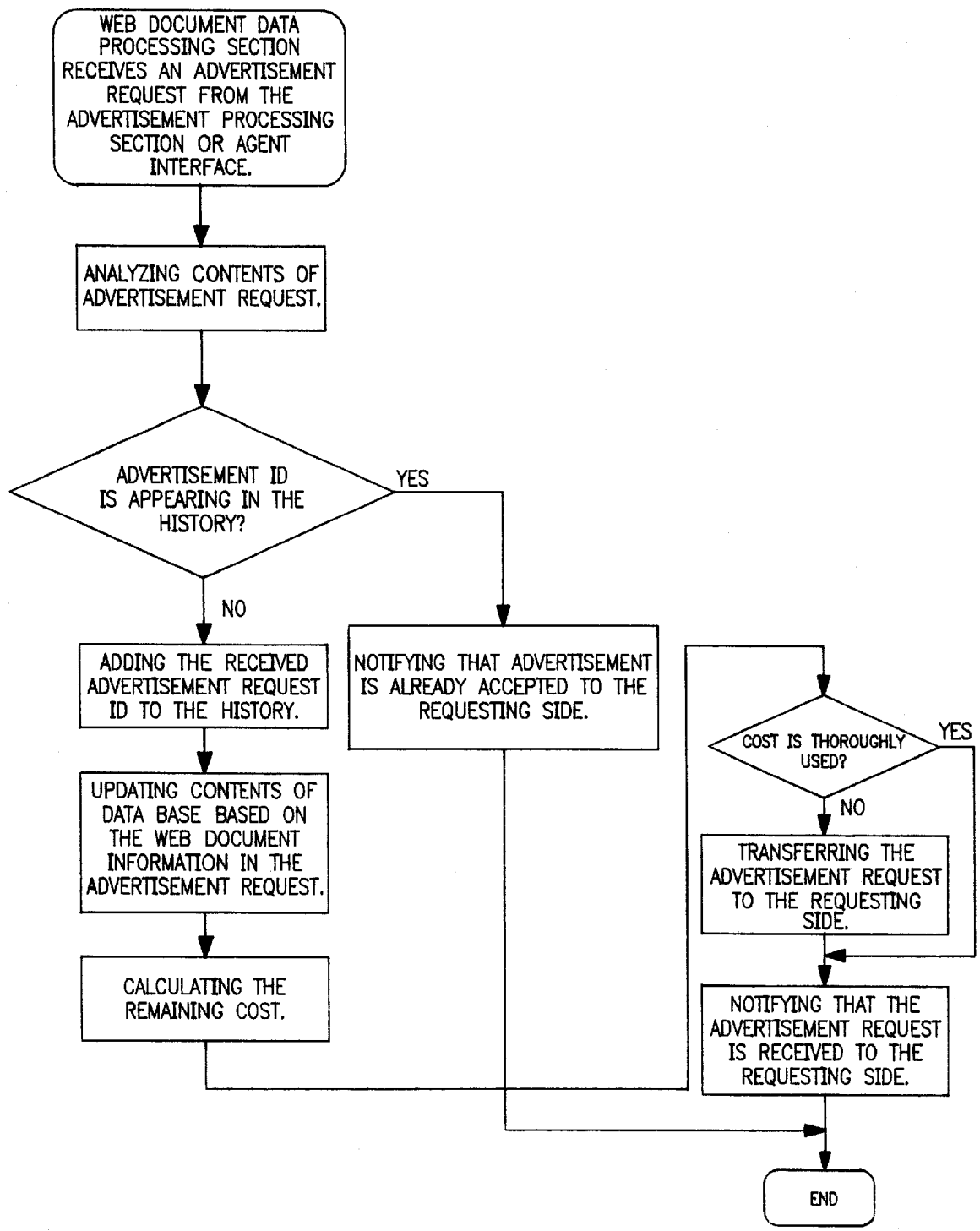
FIG. 19 is a flowchart of an advertisement request in the searching apparatus of FIG. 18.

A process performed after the Web document data control section 30' has received the advertisement request data from the advertisement processing section 22 and agent interface 26 as explained above is illustrated in FIG. 19.

A Web document reader 38' searches the Web document through the searcher interface 40. The inquiry processing section 24 produces the search request based on the input from a Web document reader 38' and transmits the search request to the Web document data control section 30'. Format of the search request is similar to that illustrated in FIG. 8a–8c.

The Web document data control section 30' searches the Web document database 28' to ascertain Web documents that satisfy the search request, and stores the search result. As in the case of the advertisement, the Web document data control section 30' calculates the remaining available cost and transfers the search request to other agents through the agent interface 26 where there is an allowance in cost, and then waits for return of the search result.

When the search result is returned from all agents which have issued the search request, or after a predetermined time has passed, the collected search results are then sent to the inquiry processing section 24 to convert the result into a list format. The list of the search result is presented to the Web document reader 38 ' through the searcher interface 40. When the search request is received from another agent, the search request is transferred to the Web document data control section 30' through the agent interface 26. The search result is returned to the agent in the request issuing side through the agent interface 26.

Figure 20:
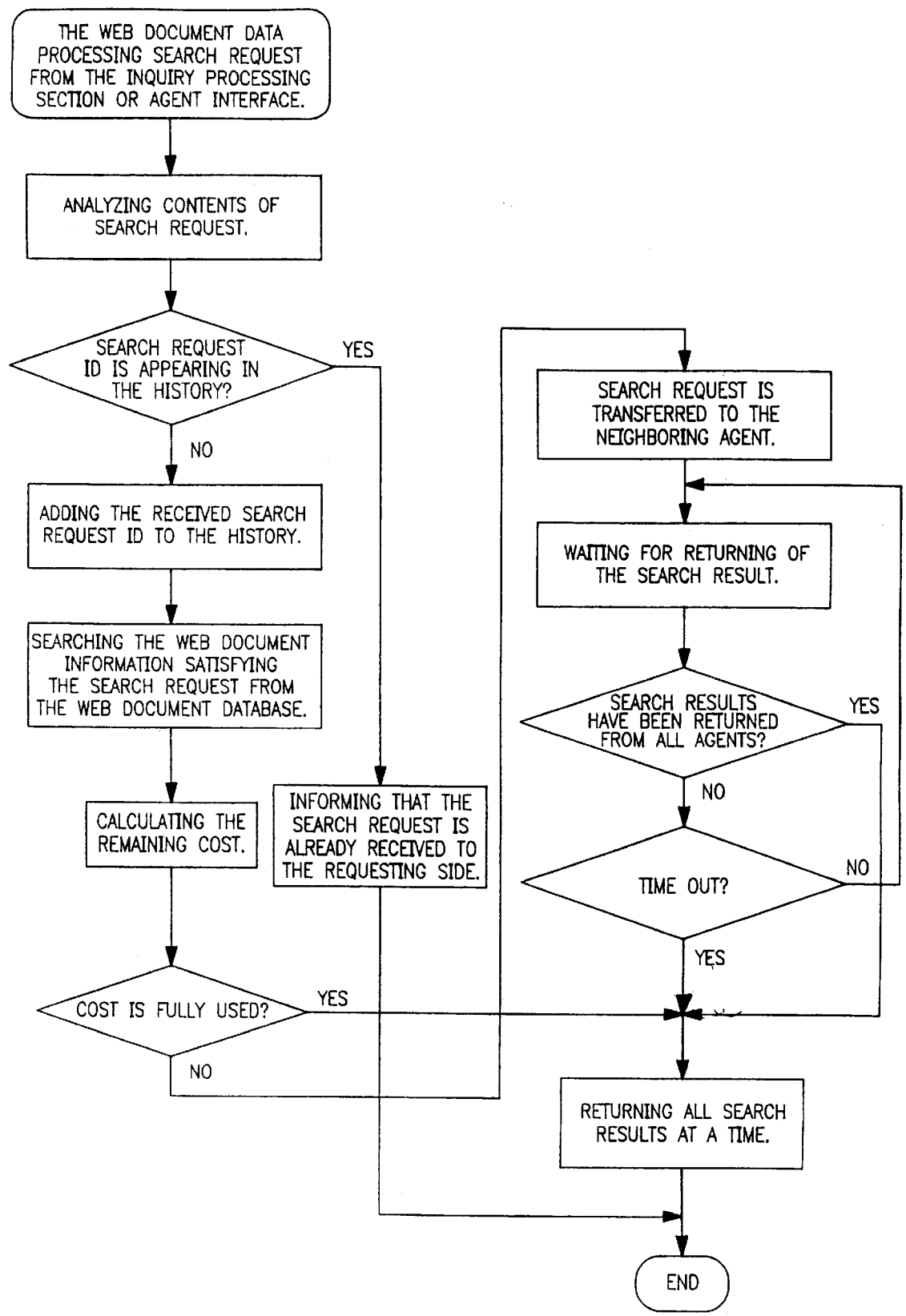
FIG. 20 is a flowchart of a search request in the searching apparatus of FIG. 18.

A process performed after the Web document data control section 30' has received the search request from the inquiry processing section 24 and agent interface 26 is illustrated in FIG. 20.

Figure 21:
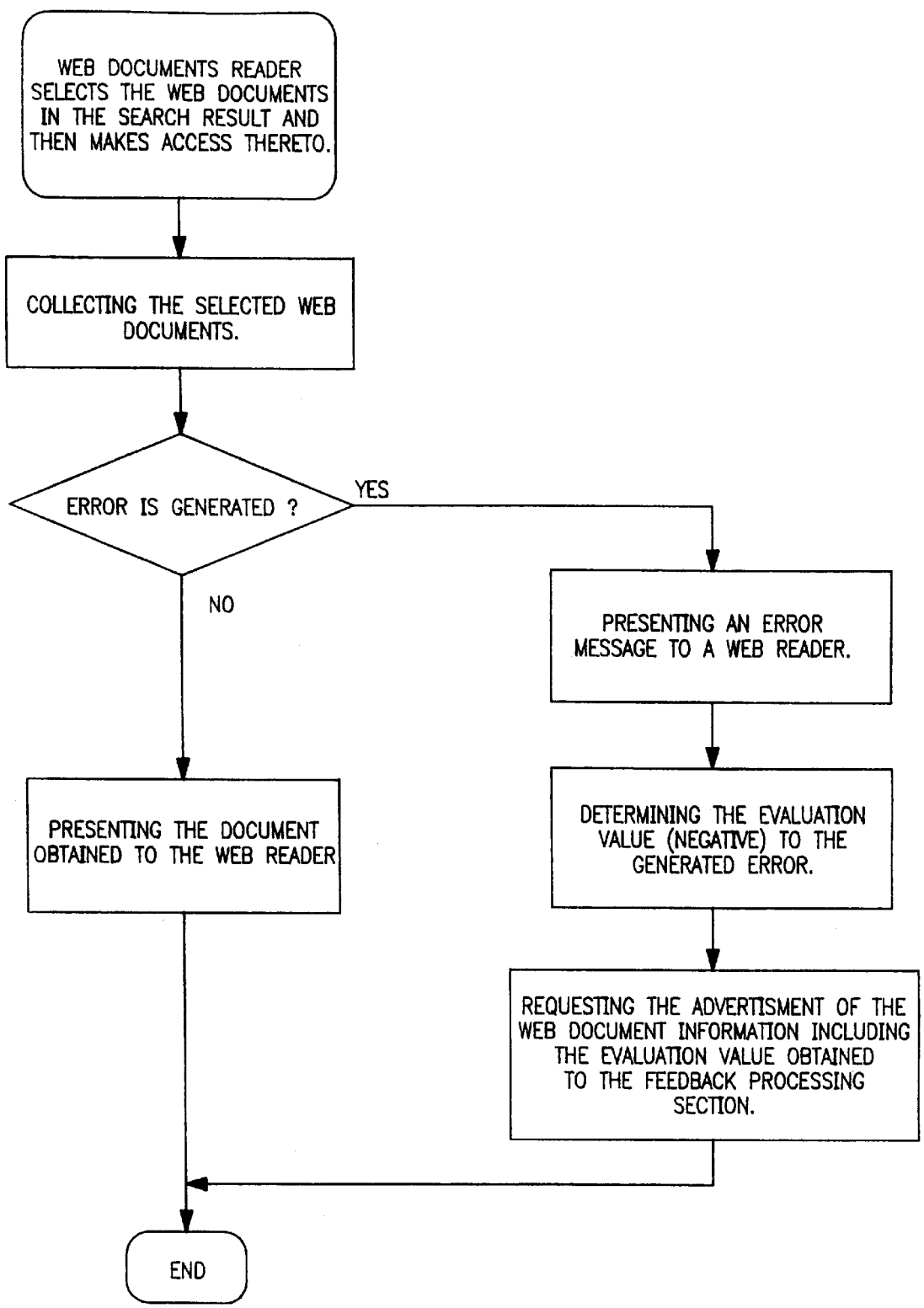
FIG. 21 is a flowchart of a searcher interface in the searching apparatus of FIG. 18.

The agent directly receiving the search request from the Web document reader 38' presents the search result to the Web document reader 38'. The Web document reader 38' accesses, on the basis of the search result obtained as explained above, the Web document actually indicated in the search result through the searcher interface 40, asking the reader to evaluate whether the Web document has satisfied the request of the reader. In some cases, an evaluation is automatically made by the searcher interface 40. Since a condition where the actual Web document does not exist, or it cannot be used for some reason is not preferable, it is possible to automatically collect the evaluation of such condition as a negative evaluation. A process performed by the searcher interface 40 in this case is illustrated in FIG. 21.

For collection of the Web documents, not only the advertisement from the Web document producer, but also the Web document information of the existing search engine C may be used. The agent plays the role of a wrapper of search engine and is assumed to employ 7-, an application mode in which information about te Web documents can be exchanged with each other. Thereby, it can be realized that the existing search engines may be incorporated and integrated to integrally utilize all search engines.

Figure 22:
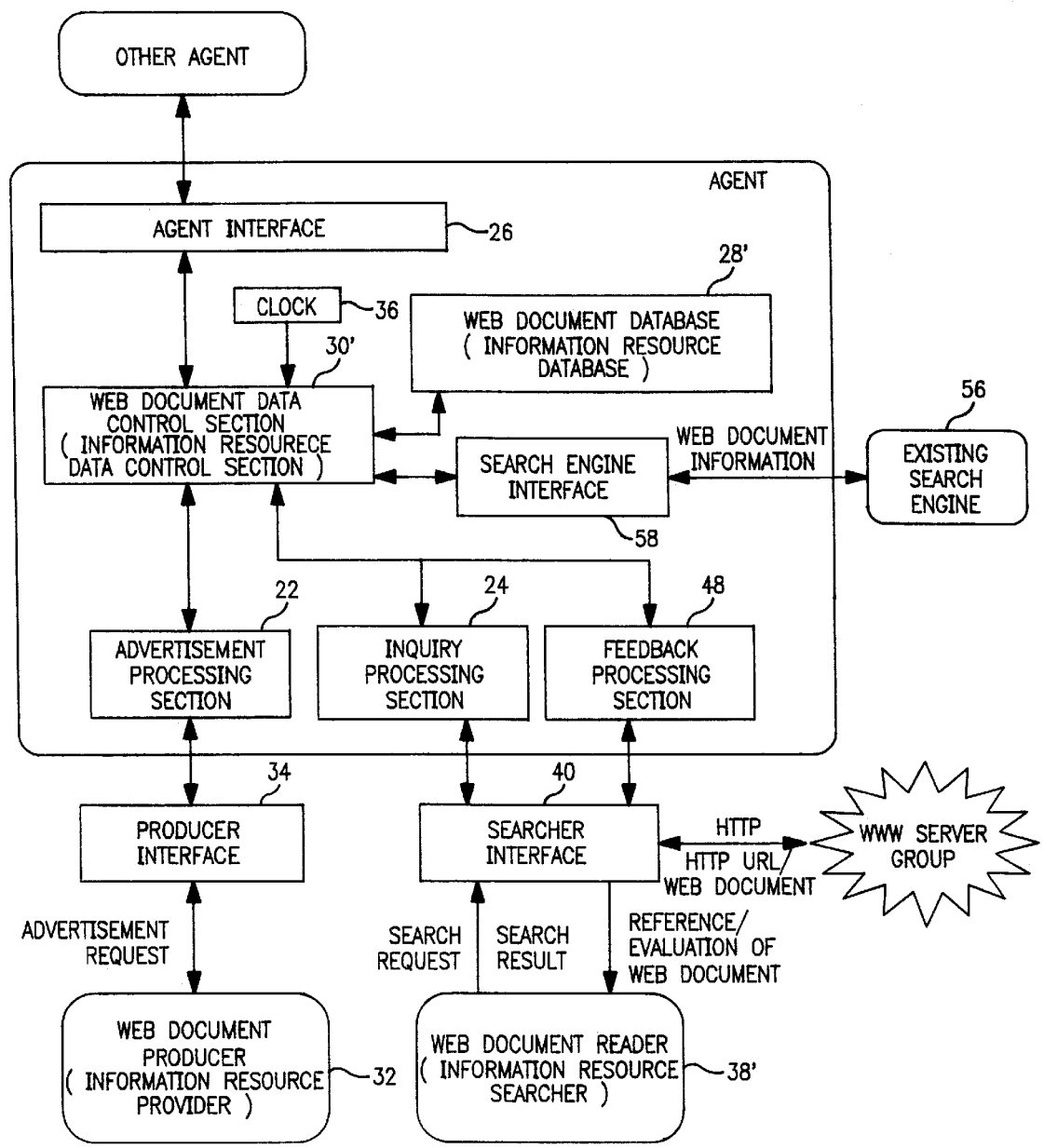
FIG. 22 is a block diagram of a searching apparatus according to a preferred seventh embodiment of the present invention.

FIG. 22 illustrating a distributed search engine utilizing an existing search engine 56 according to a sixth preferred embodiment. This distributed search engine is similar to the distributed search engine described above, but the existing search engine 56 differs in that a search engine interface 58 obtains the Web document information from the existing search engine 56.

The search engine interface 58 extracts the keywords included in the search request to execute the search, using the existing search engine 56 to present the Web document obtained to the information searcher from the Web document data control section 30' via the searcher 7; interface 40.

Moreover, the Web document database 28' cashes the Web document information of the existing search engine, and functions as a database of evaluation information in regard to the Web document. Advertisement information corresponding to the Web document is produced in the format of the advertisement information, as described above, by analyzing the Web document, and is then stored in the Web document database 28'.

A basic operation for the advertisement request is same as described in the embodiments above, but other operations for the search request may be used depending on an application mode of the existing search engines.

For example, in a mode in which the existing search engine is mainly used as the Web document database 28' and the Web document database 28' is used to store evaluation information for the Web document, the search engine is searched through the search engine interface 58 for the search request, and the Web document database 28 is searched for each Web document obtained. Thereby the evaluation information is given and is then returned to the agent or Web document reader 38'.

In a mode in which the Web document database 28' is mainly used but the existing search engine is complementarily used when sufficient search result cannot be obtained, the Web document database 28' is first searched for the search request. When the result satisfying the search request cannot be obtained, or a sufficient amount of Web document information cannot be obtained, the search is conducted using the existing search engines through the search engine interface 58. The result is then is presented to the Web document reader 38' and is also registered in the Web document database 28' in preparation for the next search.

In a mode in which the existing search engines are used for management and maintenance of the Web document database 28', the search is conducted by utilizing the Web document database 28' in the same way as the ordinary search operation. Simultaneously, the history of search requests is stored, and the search engine is searched every predetermined time based on the history of the search requests through the search engine interface 58 to update the Web document database 28' based on the result of the search.

As explained above, according to the present invention, information about the information resource can be managed automatically without the need for manual intervention. As a result, it is no longer necessary for the resource information manager to utilize procedures for registration and maintenance of information. In addition, the present invention is based on an announcement of an information resource provider, like the existing directory service, and never deteriorates quality of information, which is a merit of the directory service.

Moreover, total communication traffic can be reduced because strength for change of the network environment, load distribution of the search, and accessibility of searcher can be improved through distributed management of resource information and redundancy in coupling among agents, and because the range of an agent advertising the resource information and the range of an agent as the search object can be limited by restricting the cost available for advertisement and search. In addition, since useless access to a server of an information resource, such as a robot program, is no longer required, a load of the server is reduced.

Moreover, the information resource provider can always update the resource information by accessing the nearest agent. Meanwhile, since the update information can be immediately transmitted to other agents as a result of feedback regarding availability of the information resource by the information resource provider, preventing generation of commonly placed resource information can be expected.

Due to feedback regarding evaluation of the information resource by the information resource searcher, information about effective information resource can be easily found. In addition, other non-effective resource information can be prevented from being be found by adjusting the living period of the resource information on each agent. Since resource information obtained in the research result is sequentially ordered based on a total evaluation corresponding to feedback of many searchers, the effect of easier location, selection and application of a positive information resource can also be expected even if the information resource searchers do not have sufficient knowledge and skill to select information resources. Therefore, the present invention makes a significant contribution to effective distributed management and search of a large scale resource information.

What is claimed is:

1. A distributed search system connecting a plurality of computers on a network, each of the plurality of computers comprising:

means for storing advertisement information including position information of an information resource;

means for searching the storing means of each of the plurality of computers in response to a search request;

means for accepting a request to register advertisement information in said storing means; and means for transferring the advertisement information requested to be registered to the plurality of computers, wherein transferring of the advertisement information is determined by cost information given to the advertisement information.

2. A distributed search system according to claim 1, wherein the search request is relayed along a path between one or more of the plurality of computers, and advertisement information stored in each of the one or more plurality of computers is updated during an inverse trace of the path.

3. A distributed search system according to claim 1, the storing means further comprising storing an evaluation value of an information resource corresponding to advertisement information obtained during the search by the searching means.

4. A distributed search system according to claim 3, further comprising:

means for selecting advertisement information having a positive evaluation value and/or information resources corresponding to the selected advertisement information from the search result, and presenting the selected information resource to an information resource searcher making the search request.

5. A distributed search system according to claim 3, further comprising means for providing an evaluation value of an information resource designated by an information resource searcher to an information resource provider.

6. A distributed search system according to claim 3, wherein a period for storing the advertisement information stored in each computer is changed and/or deleted based on the evaluation value given to the advertisement information.

7. A distributed search system connecting a plurality of computers on a network, each of the plurality of computers comprising:

means for storing advertisement information including position information of an information resource; and means for searching the storing means in response to a search request, wherein the search request is accepted from searching means of the plurality of computers, and a search range corresponding to the search request is determined by cost information of the search request.

8. A distributed search system according to claim 7, wherein the search request is relayed along a path between one or more of the plurality of computers, the distributed search system further comprises means for updating the stored advertisement information in each of the one or more plurality of computers during an inverse trace of the path.

9. A distributed search system according to claim 7, wherein the storing means stores an evaluation value given to an information resource corresponding to advertisement information obtained in response to the search request.

10. A distributed search system according to claim 9, further comprising means for selecting advertisement information having a positive evaluation value and/or information resources corresponding to the selected advertisement information from the search result, and presenting the selected information resource to an information resource searcher making the search request.

11. A distributed search system according to claim 9, further comprising means for supplying an evaluation value designated by an information resource searcher to the plurality of computers.

12. A plurality of searching apparatus, having corresponding information resources, connected to a network that includes an information resource provider, each of the plurality of searching apparatus comprising:

a storage device to store advertisement information that includes position information corresponding to the information resources;

an advertisement processing device to accept registration of the advertisement information from the information resource provider; and a control device to store the advertisement information accepted for registration by the advertisement processing device in the storage device, transfer the advertisement information accepted for registration to the plurality of searching apparatus, and store and transfer advertisement information transferred from the plurality of searching apparatus.

13. A plurality of searching apparatus according to claim 12, wherein cost information is included in the advertisement information, and the control device determines whether the advertisement information is transferred to the plurality of searching apparatus based on the cost information.

14. A plurality of searching apparatus according to claim 13, wherein the control device calculates the cost information and the cost information is updated when the control devices transfers the advertisement information.

15. A plurality of searching apparatus according to claim 13, wherein the information resources of the plurality of searching apparatus include a corresponding evaluation value, and the advertisement processing device obtains the evaluation value of the accepted advertisement information and presents the obtained evaluation value to one of the plurality of searching apparatus.

16. A searching apparatus, from among a plurality of searching apparatus having information resources, that processes a search request from an information resource searcher, comprising:

a storage device to store advertisement information that includes position information of the information resources;

an interface device to provide a search result, having corresponding advertisement information, in response to the search request; and a control device to search the storage device in response to the search request, transfer the search request to the plurality of searching apparatus, search the storage device in response to a search request transferred from one of the plurality of searching apparatus and transfer the transferred search request to the plurality of searching apparatus other than the one searching apparatus, and transfer resulting advertisement information to the information resource searcher or the one of the plurality of searching apparatus.

17. A searching apparatus according to claim 16, wherein cost information is included in the search request, and the control device determines whether the search request is transferred to the plurality of searching apparatus other than the one of the plurality of searching apparatus based on the cost information.

18. A searching apparatus according to claim 17, wherein the control device updates the cost information and transfers the search request to the plurality of searching apparatus other than the one of the plurality of searching apparatus based on the updated cost information.

19. A searching apparatus according to claim 16, further comprising a searching device to obtain an information resource based on position information in the advertisement information of the search result provided by the interface device.

20. A searching apparatus according to claim 16, wherein the control device obtains an information resource based on the position information included in the advertisement information of the search result provided by the interface device, and transfers the information resource to the one of the plurality of searching apparatus, or to the information resource searcher.

21. A searching apparatus according to claim 16, wherein an evaluation value is accepted from the information resource searcher, the searching apparatus further comprising a feedback processing device to determine a storage period of advertisement information corresponding to the information resources, and/or determine whether the advertisement information is deleted based on the evaluation value, wherein the storage period is stored in the storage device, and the control device changes the storage period and/or deletes the advertisement information and informs the plurality of searching apparatus of the changes to the storage period and the deletion of the advertisement information.

22. A searching apparatus according to claim 16, wherein the stored advertisement information includes an evaluation value, and the interface device selects advertisement information having a positive evaluation value and/or information resources corresponding to the selected advertisement information from the search result, and presents the selected information resource to the information resource searcher.

23. A searching apparatus according to claim 16, wherein the search request includes keywords, the searching apparatus comprising a search engine interface device to extract the keywords execute the search using the extracted keywords, and transmit resulting 77 information resources to the information resource searcher.

24. A searching apparatus according to claim 23, wherein the control device produces advertisement information corresponding to the resulting information resources, and stores the produced advertisement information in the storage device.

* * * * *

UNITED STATES PATENT AND TRADEMARK OFFICE
CERTIFICATE OF CORRECTION

PATENT NO. : 6,212,545 B1  Page 1 of 1
DATED : April 3, 2001
INVENTOR(S) : Takehishi Ohtani et al.

It is certified that error appears in the above-identified patent and that said Letters Patent is hereby corrected as shown below:

<u>Column 20,</u>
Line 2, delete "77".

Signed and Sealed this

Twenty-fifth Day of September, 2001

Attest:

*Nicholas P. Godici*

NICHOLAS P. GODICI
*Attesting Officer*   *Acting Director of the United States Patent and Trademark Office*